May 3, 1955        A. G. RINDFLEISCH        2,707,432
MACHINE FOR WRITING CHECKS
Filed Dec. 16, 1950        12 Sheets-Sheet 1
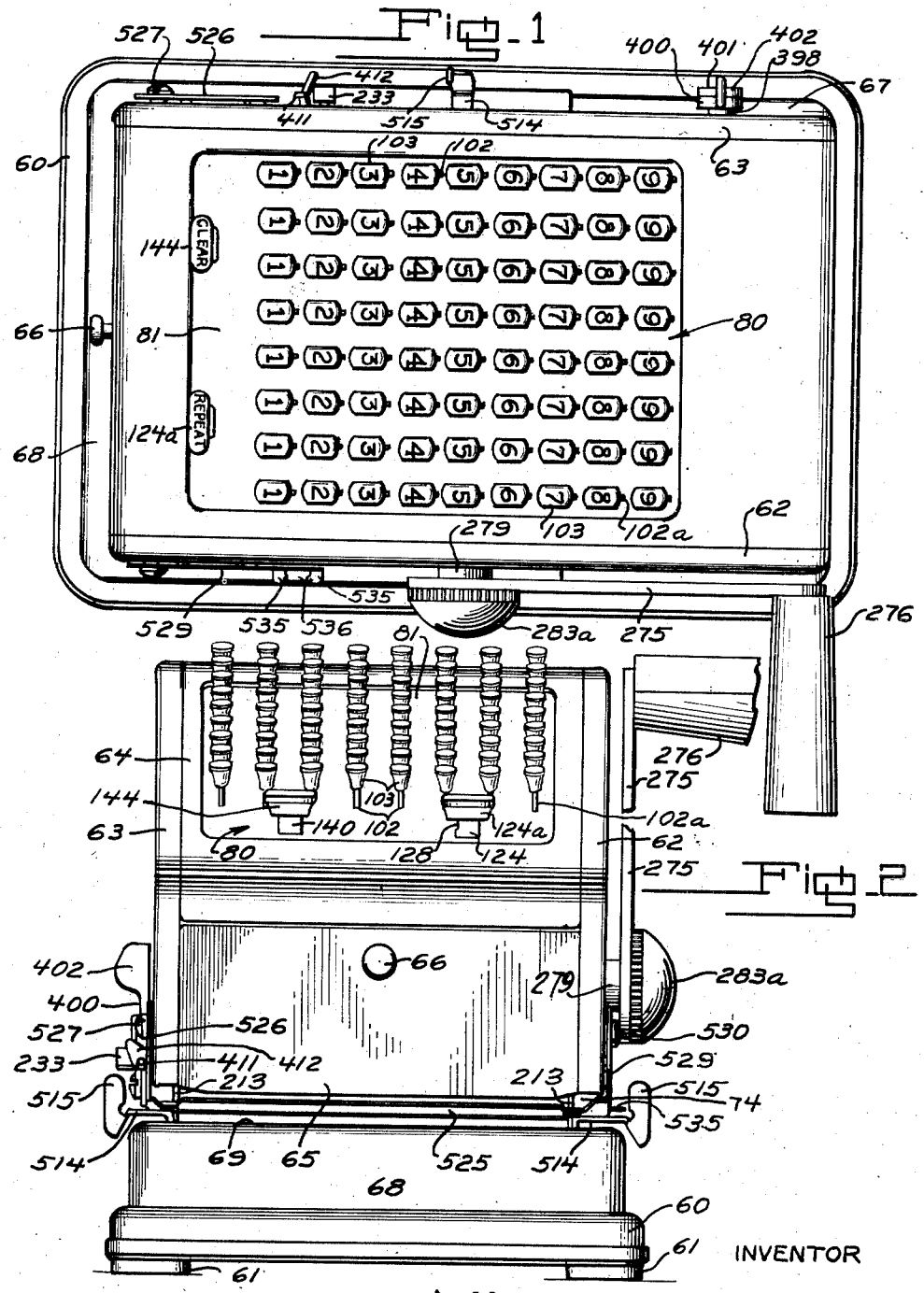
INVENTOR
Arthur G. Rindfleisch
BY
ATTORNEYS

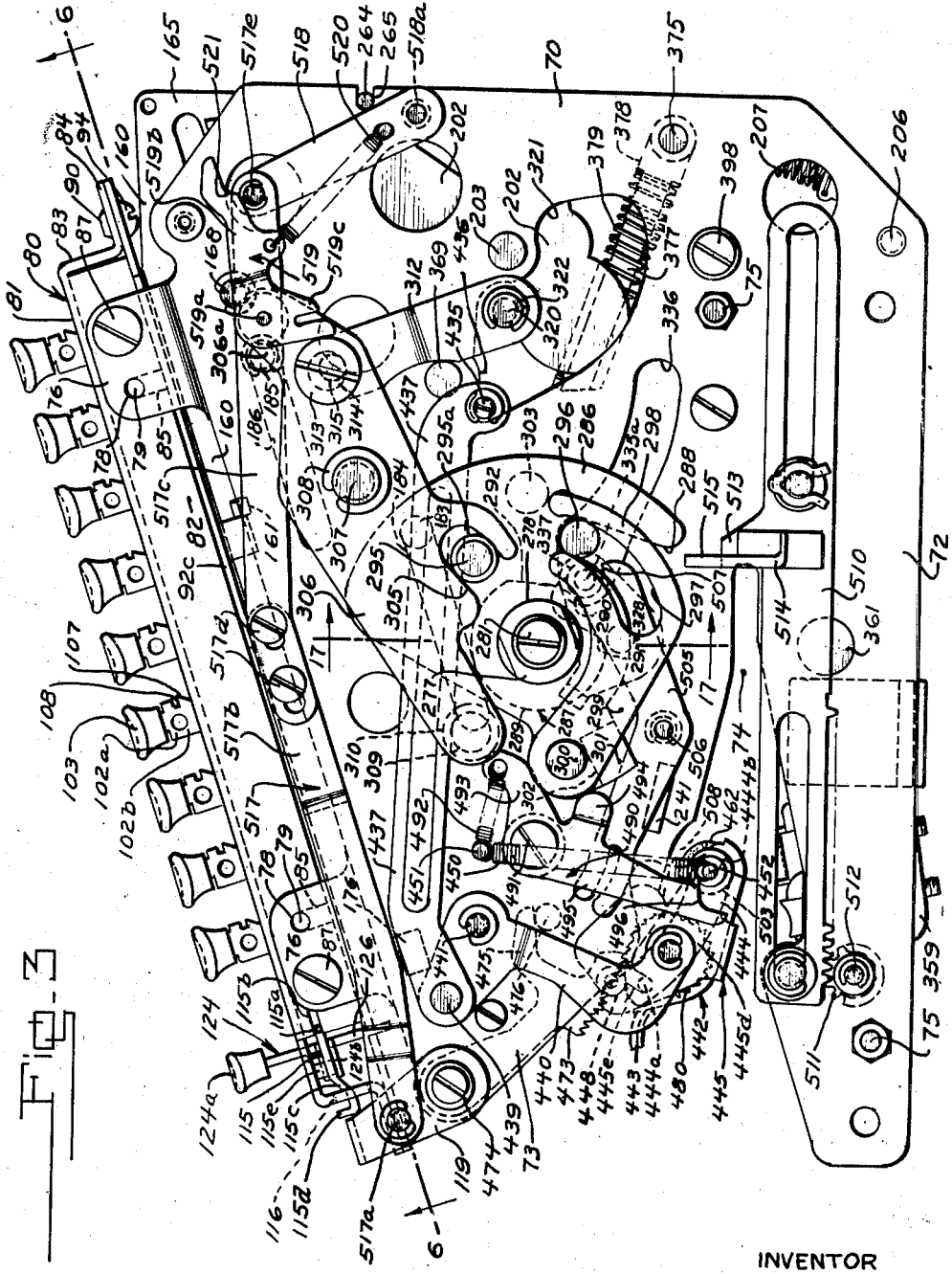

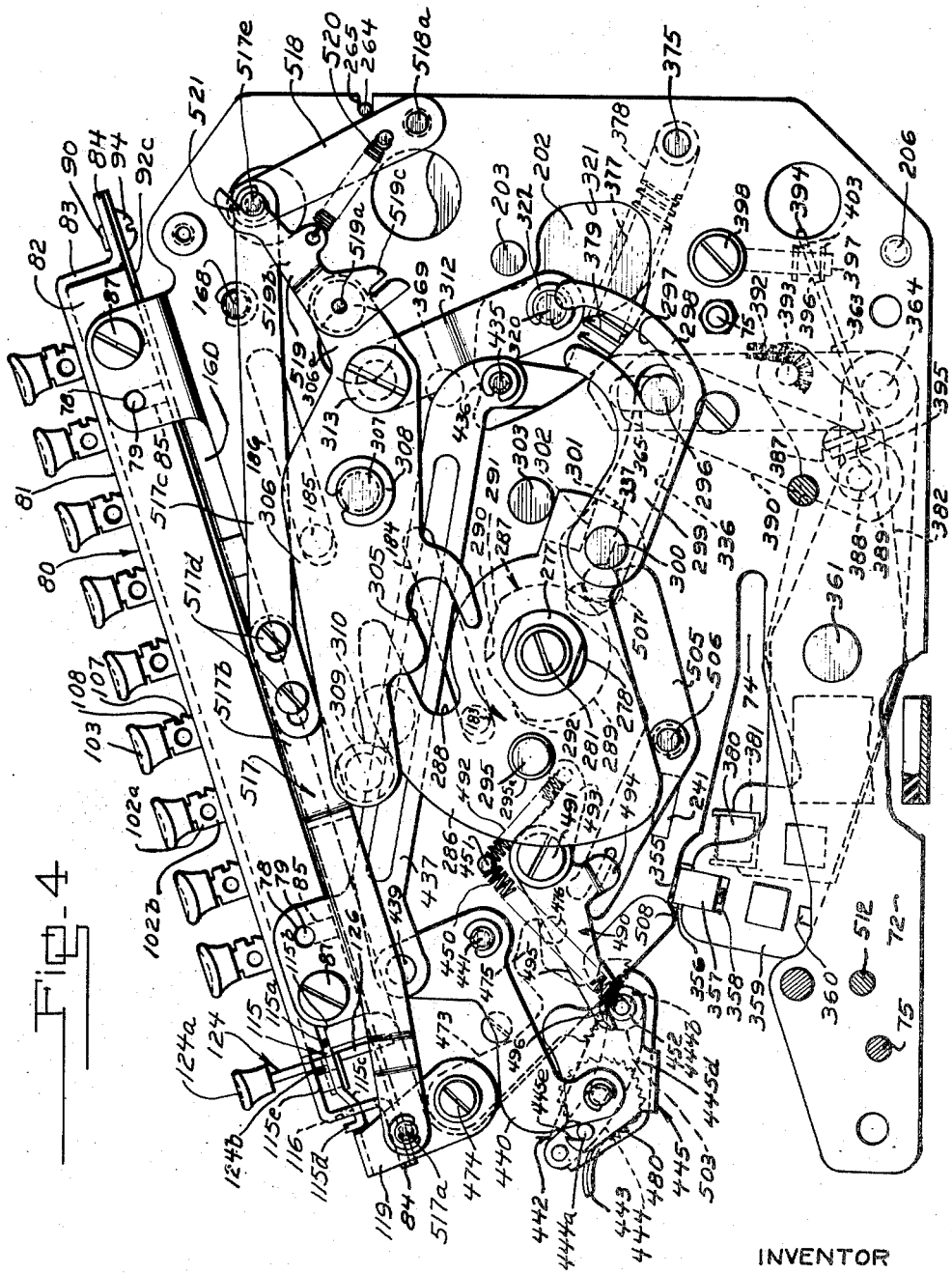

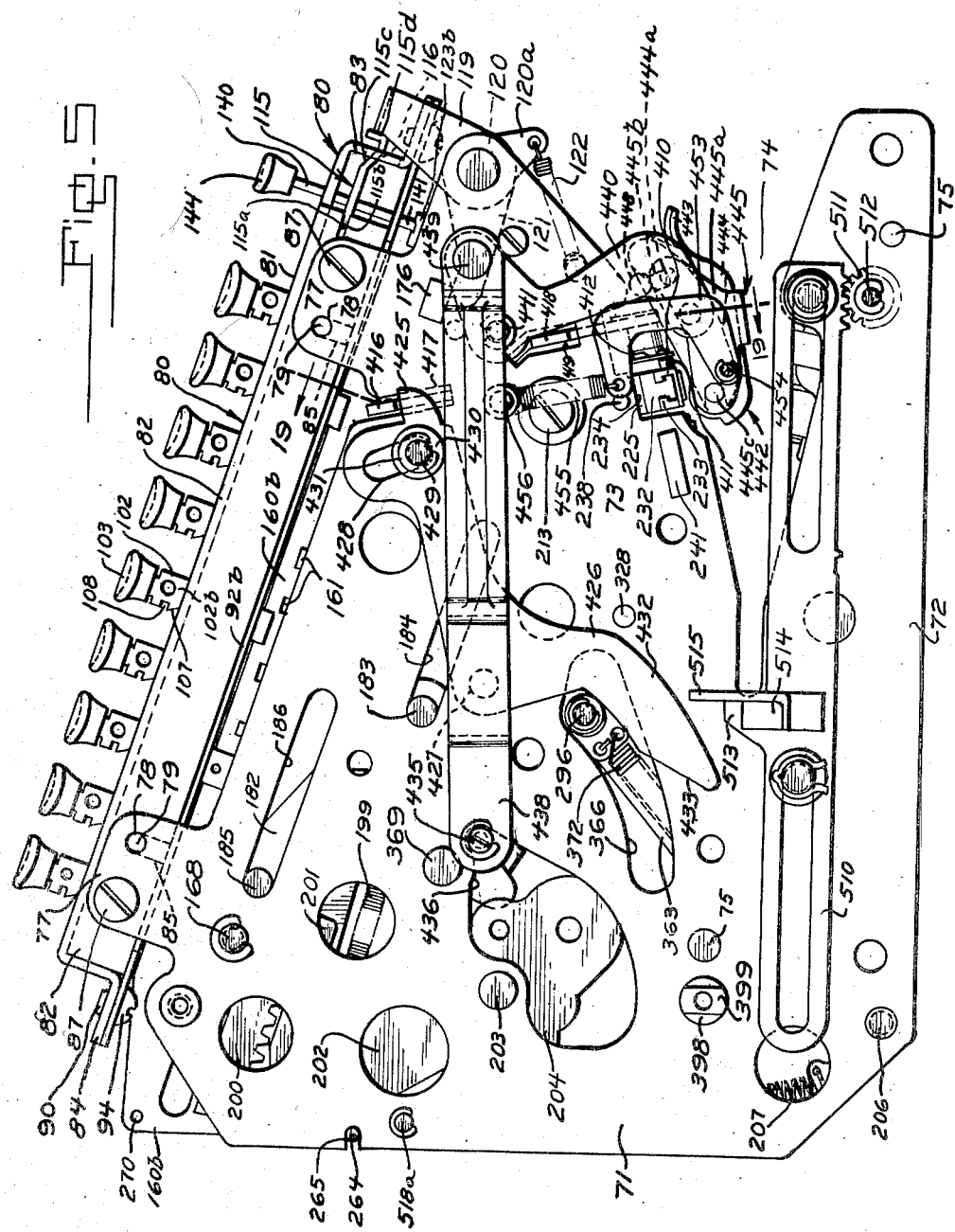

May 3, 1955  A. G. RINDFLEISCH  2,707,432
MACHINE FOR WRITING CHECKS
Filed Dec. 16, 1950  12 Sheets-Sheet 5
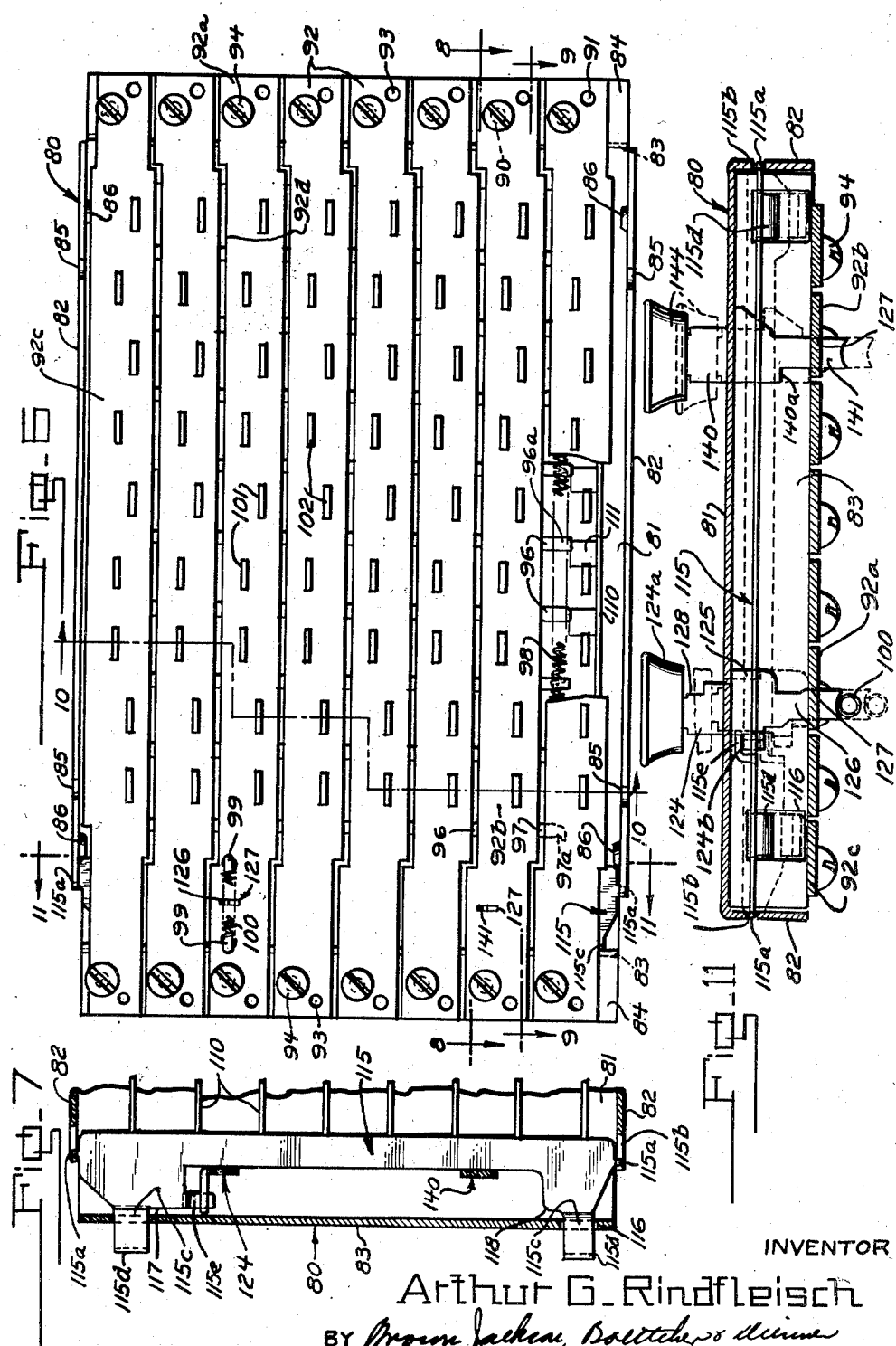
INVENTOR
Arthur G. Rindfleisch
BY
ATTORNEYS

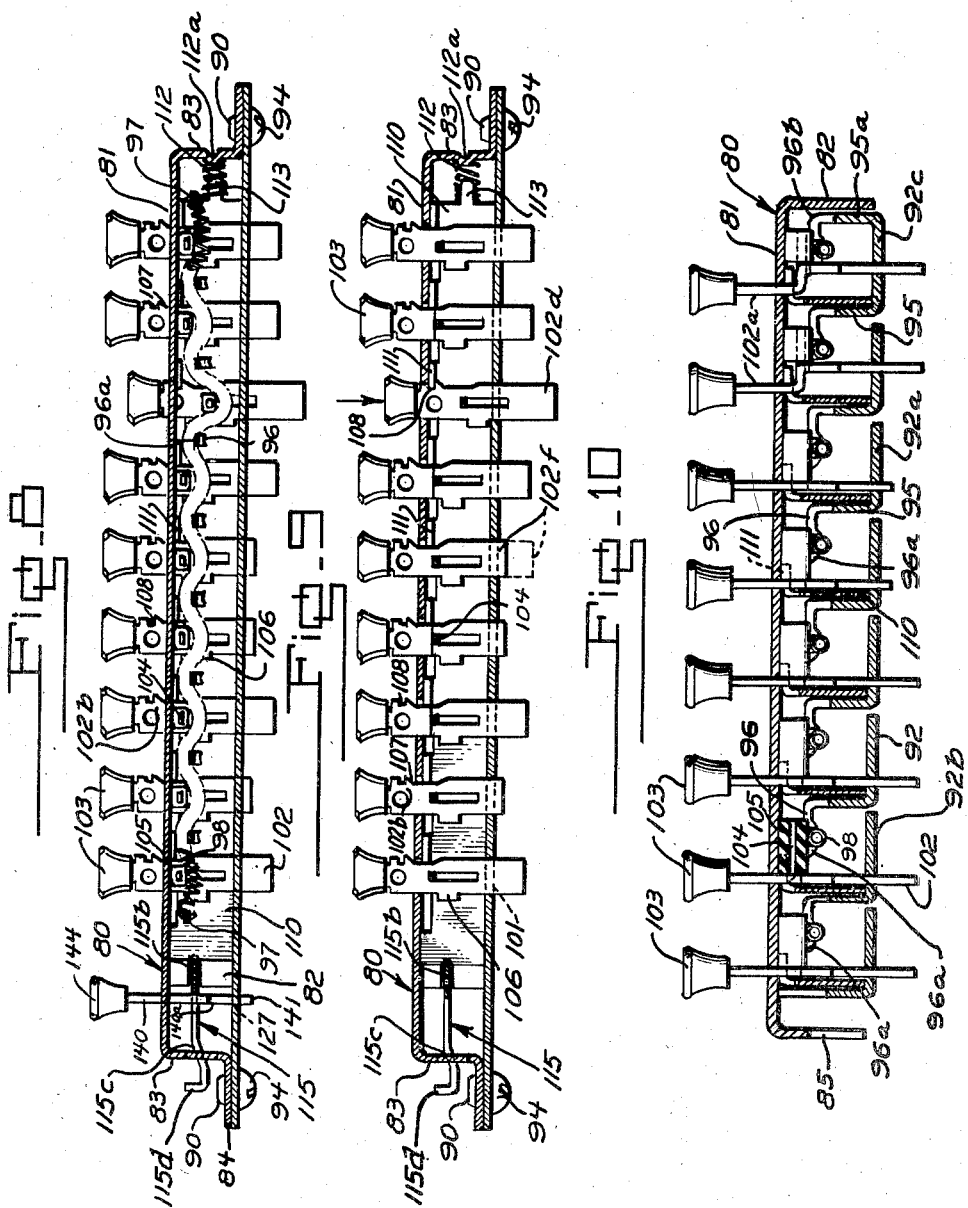

May 3, 1955
A. G. RINDFLEISCH
2,707,432
MACHINE FOR WRITING CHECKS
Filed Dec. 16, 1950
12 Sheets-Sheet 7
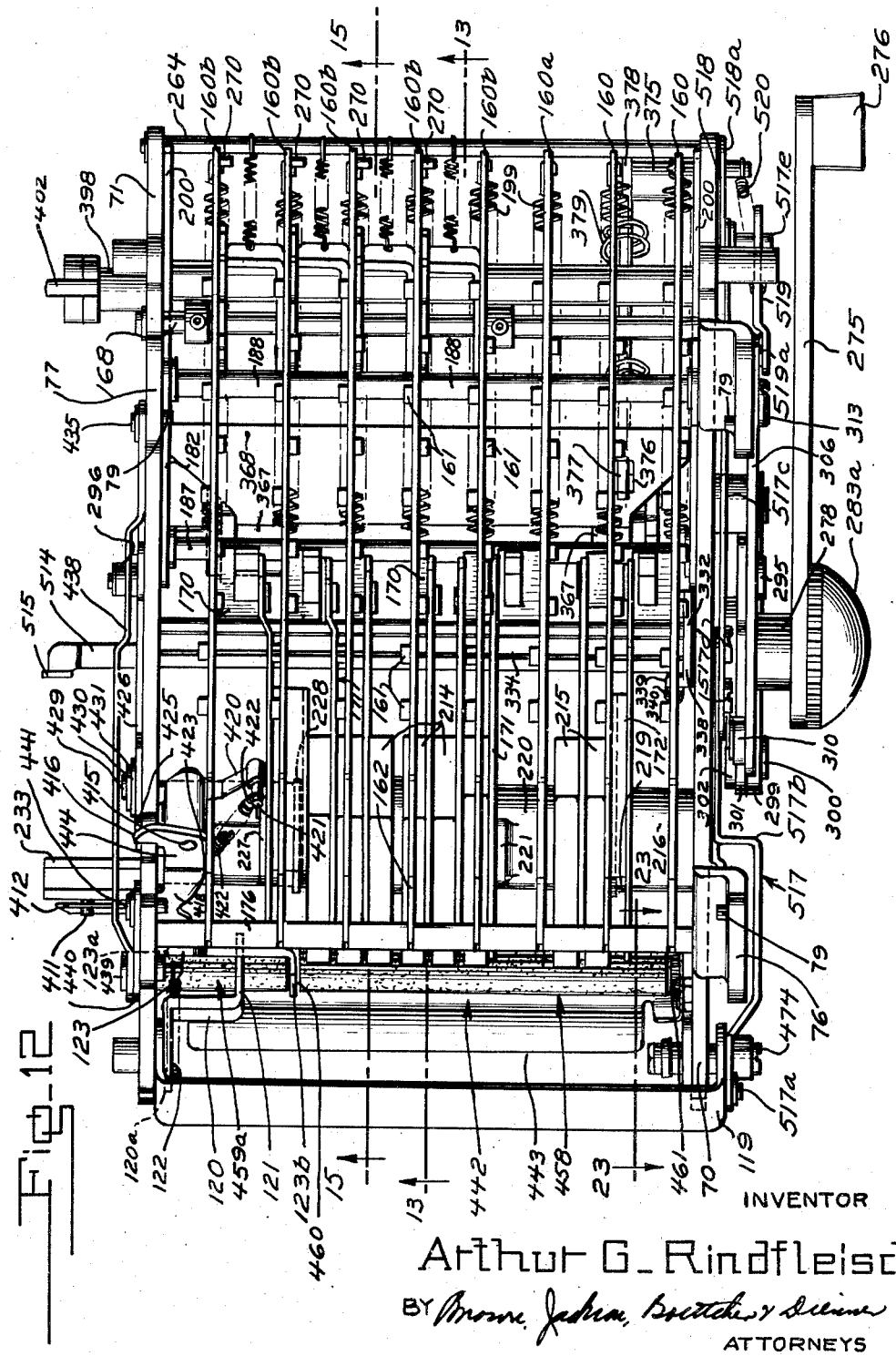
INVENTOR
Arthur G. Rindfleisch
BY
ATTORNEYS

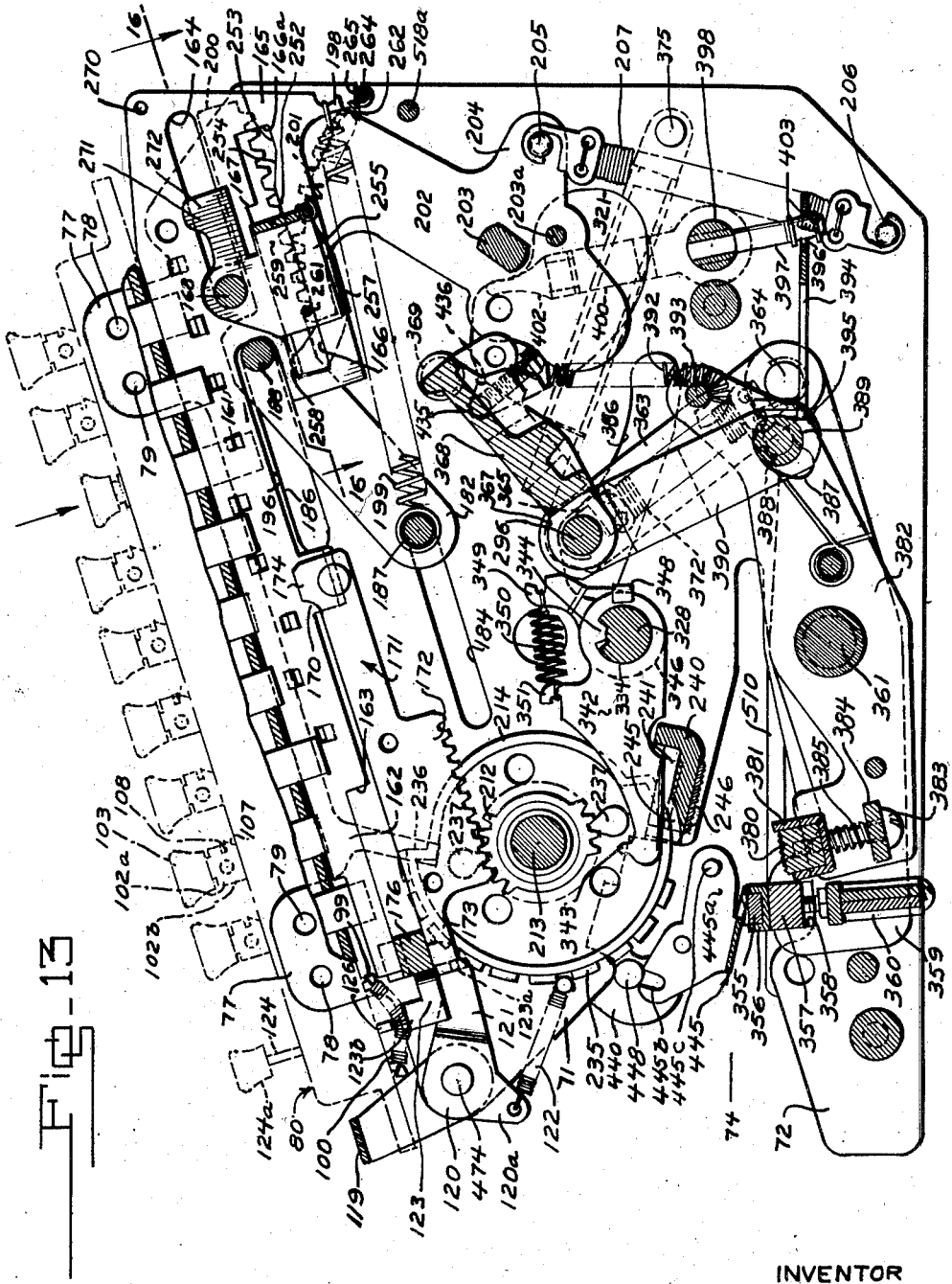

INVENTOR
Arthur G. Rindfleisch
BY
ATTORNEYS

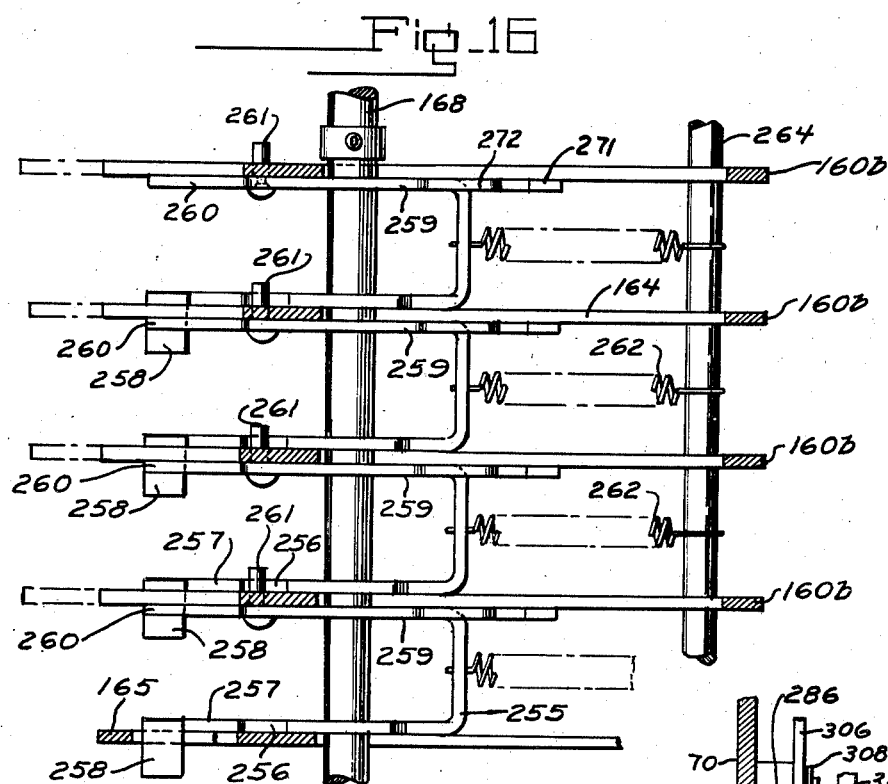
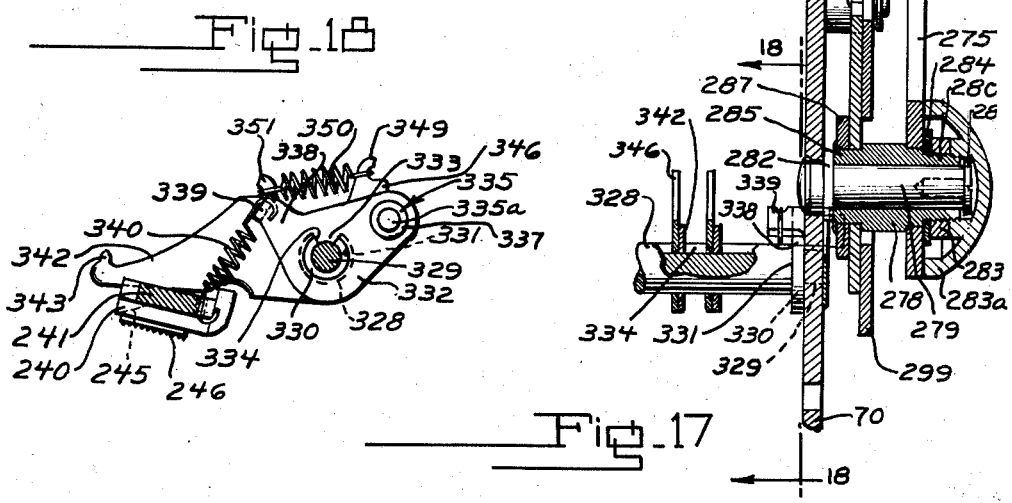

May 3, 1955

A. G. RINDFLEISCH 2,707,432

MACHINE FOR WRITING CHECKS

Filed Dec. 16, 1950

INVENTOR

Arthur G. Rindfleisch

BY

ATTORNEYS

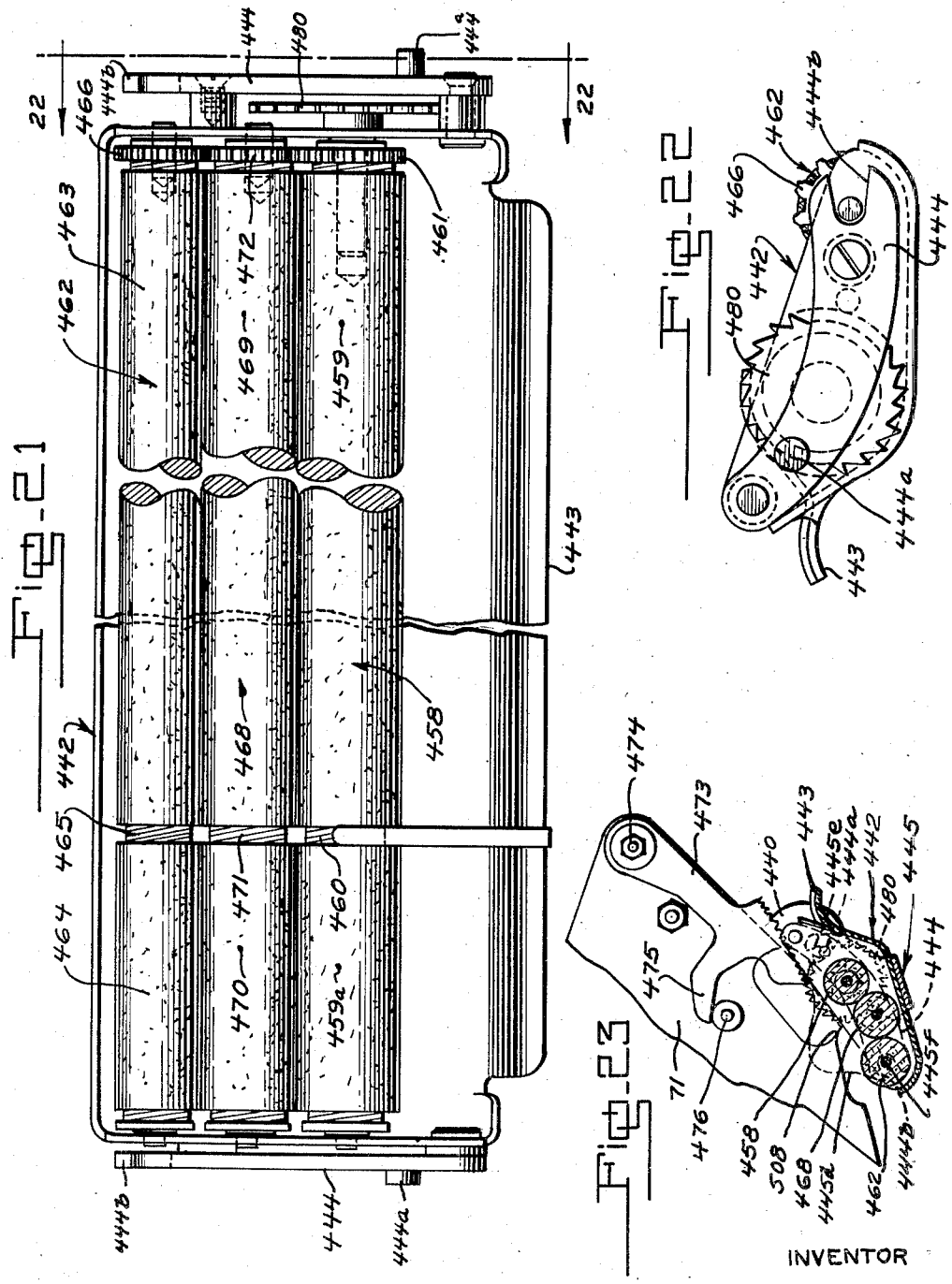

United States Patent Office 2,707,432
Patented May 3, 1955

2,707,432

MACHINE FOR WRITING CHECKS

Arthur G. Rindfleisch, Chicago, Ill., assignor to Theodore B. Hirschberg, Jr., Chicago, Ill.

Application December 16, 1950, Serial No. 201,190

13 Claims. (Cl. 101—95)

This invention relates to machines for writing checks and like instruments, and has to do with a machine employing independently adjustable printing segments or instrumentalities and cooperating platen means for effecting the printing operation.

My invention is directed to a check writing machine of the keyboard type having improved clearing and repeat means of simple construction and operation, and provided with improved inking means which may be removed and replaced with expedition and facility. More particularly, the clearing and repeat means may be operated automatically for returning all of the printing segments to zero or non-printing position upon completion of a printing operation, or may be rendered inoperable by means of a "repeat" key, for printing a plurality of checks all for the same amount, and may thereafter be operated by means of a "clear" key for resetting the machine for printing checks for different amounts. The inking means comprises an ink roller assembly and mounting means therefor such that the assembly may readily be removed and replaced, and means for actuating the inking means in such manner that only the type on the printing line of the machine are inked during actuation of the machine for printing, the inking roller being then moved out of contact with the type during the remainder of the operation of the machine in the printing of a check. Further objects and advantages of my machine will appear from the detail description.

In the drawings:

Figure 1 is a plan view of a check-writing machine embodying my invention;

Figure 2 is a front view of the machine;

Figure 3 is a left side view, on an enlarged scale, of the machine with the enclosing casing removed and the parts thereof in normal positions;

Figure 4 is a view similar to Figure 3, with the parts of the machine in the positions which they occupy during the printing operation, certain parts being omitted, other parts being shown in section and other parts being shown partly broken away and in section;

Figure 5 is a right side view of the machine, wtih the enclosing casing removed and the parts thereof in normal positions, on the same scale as Figure 3;

Figure 6 is an underneath view, on an enlarged scale of the keyboard assembly unit, with one of the bottom strips removed;

Figure 7 is a sectional view of the forward portion of the keyboard assembly unit, taken in a plane parallel to the top plate of the unit housing, looking toward the top plate, certain parts being shown in underneath view;

Figure 8 is a sectional view taken substantially on line 8—8 of Figure 6, showing one of the setting keys in depressed or operative position;

Figure 9 is a sectional view taken substantially on line 9—9 of Figure 6, showing one of the keys in depressed or operative position;

Figure 10 is a sectional view taken substantially on line 10—10 of Figure 6, on an enlarged scale, certain parts being shown in elevation;

Figure 11 is a sectional view taken substantially on line 11—11 of Figure 6, on an enlarged scale, certain parts being omitted, certain other parts being broken away and shown in section, and other parts being shown in elevation, the repeat and the clearing keys being shown in full lines in raised or inoperative positions and in dotted lines in depressed positions;

Figure 12 is a plan view of the machine with the enclosing casing therefor and the keyboard assembly unit removed and the setting bars and associated parts omitted, certain other parts being omitted for clearness of illustration;

Figure 13 is a sectional view of the machine taken substantially on line 13—13 of Figure 12, the keyboard assembly unit being indicated by dot-and-dash lines and being in part shown fragmentarily and broken away and in section, with one of the keys depressed and the parts of the machine in the positions which they normally occupy;

Figure 16 is a detail fragmentary sectional view, on an enlarged scale, taken substantially on line 16—16 of Figure 13, certain parts being shown in plan and certain other parts being broken away;

Figure 17 is a sectional view taken substantially on line 17—17 of Figure 3, certain parts being shown in elevation and certain other parts being partly broken away and shown in section;

Figure 18 is a detail sectional view taken substantially on line 18—18 of Figure 17;

Figure 19 is a sectional view taken substantially on line 19—19 of Figure 5, on an enlarged scale, certain parts being shown in elevation, with the type segments and associated elements in their normal positions;

Figure 20 is a view like Figure 19 but with the type segments and associated elements in the positions which they occupy during the printing operation;

Figure 21 is a plan view of the ink rollers and tray unit removed from the machine;

Figure 22 is a right hand end view of the unit of Figure 21; and

Figure 23 is a sectional view from front to back of the machine taken a short distance to left of the right hand side frame plate and looking toward the right, showing the ratchet pawl, the inking assembly mounting plate and associated parts at the front portion of the frame plate.

Figure 14:
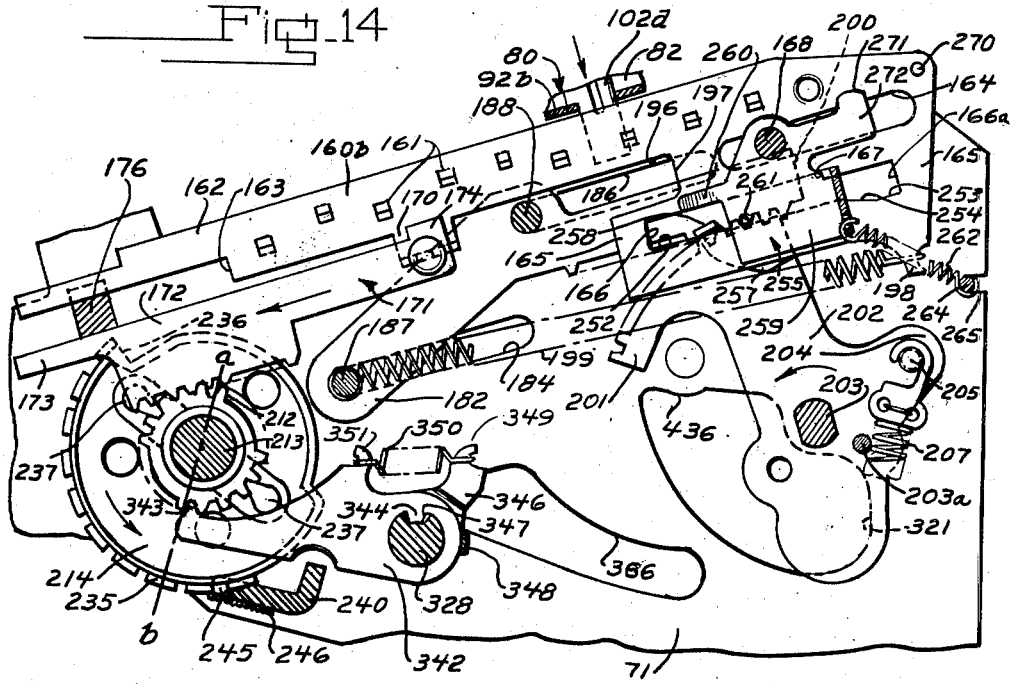
Figure 14 is a fragmentary sectional view on the same order as Figure 13, with the parts of the machine in the positions which they occupy at the end of the setting operation when a setting key has been depressed, certain parts being omitted.

The machine of my invention is provided with an enclosing casing comprising a base 60 having rubber feet 61, side plates 62 and 63, a top and back plate member 64 confined in position by the side plates, a door 65 pivoted at its lower edge between the side plates and releasably secured in the closed position by a latch controlled by a knob 66, and an intermediate portion comprising a rearward element 67 and a telescoping forward element 68 having a top wall 69 providing a plate or bed for supporting a check blank inserted into the machine. The casing is conveniently formed of sheet metal, the elements thereof being of appropriate formation and secured in assembled relation and to the frame of the machine in a suitable manner. Neither the particular construction of the casing nor the manner in which it is assembled and secured to the frame of the machine is of the essence of my invention. Suffice it to state that a suitable enclosing casing is provided, this casing being assembled and mounted upon the frame of the machine in an appropriate manner.

The frame of the machine comprises two side plates 70 and 71, shown in Figures 3 and 5, respectively, each of these plates having a lower or base portion 72 and an upper portion 73 defining a rearwardly converging substantially horizontal opening or passage 74 for accommodation of a check blank inserted into the machine, it being understood that the enclosing casing is shaped conformably to this passage.

Plates 70 and 71 are secured together in parallel spaced relation by tie rods 75. Plate 70 is provided, at its upper edge, with two outwardly offset and upwardly extending ears 76 disposed adjacent the rear and the front of the plate, these ears being aligned transversely of the frame with ears 77 extending upward from plate 71. Each of the ears 76 and 77 is provided with an opening 78 therethrough and has struck inward therefrom, adjacent said opening, a stud 79. A keyboard assembly unit 80, approximately equal in length to the length of the machine frame, fits snugly between the ears 76 and 77. This unit comprises a sheet metal housing having a top wall 81 (Figure 6), side flanges 82 depending from top wall 81, end flanges 83 depending from wall 81 perpendicular thereto, and supplemental end flanges 84 extending outward from the lower edges of flanges 83 perpendicular thereto in a plane parallel to that of top wall 81. Side flanges 82 are provided with slots 85 extending from their lower edges, these slots receiving studs 79, flanges 82 being further provided with suitably bored and tapped elements 86 (Figure 6), through which thread securing screws 87 are inserted through openings 78 of the ears. In this manner the keyboard assembly unit 80 is effectively secured upon the frame of the machine and may be removed therefrom and replaced thereon with expedition and facility.

The construction and operation of the keyboard assembly unit are illustrated in detail in Figures 6 and 11, inclusive. Each flange 84 of the housing is provided with a plurality of upwardly extending bored and tapped elements 90 and, adjacent each element, with an opening 91. The bottom of the housing is closed by a plurality of strips 92, formed of steel, seating at their end portions against the underfaces of flanges 84 and there provided with studs 93 struck upward from the strips and, adjacent the respective studs, with openings for reception of securing screws 94 threading through elements 90, studs 93 fitting into openings 91. The strips 92 are thus secured to the housing in parallel adjacent relation, as in Figure 6, and provide bottom closure means therefor. Certain of the strips, designated 92a, 92b and 92c are of slightly different construction than the other closure strips, strips 92a and 92b being of similar construction. Strip 92a is provided, at one side, with an upwardly projecting flange 95 from the upper edge of which project fingers 96 extending at the side of flange 95 opposite to strip 92a. The outer terminal portion of each finger 96 is arched downwardly to provide a downwardly curved element 96a. Flange 95 is further provided, adjacent each end thereof, with an outwardly projecting finger 97 provided, in its outer edge, with a notch 97a (Figure 6). A tension coil spring 98 (Figure 8) has its ends hooked about fingers 97 and extends therebetween above fingers 96, seating in the terminal elements 96a of these fingers. Strip 92a is further provided, adjacent its forward end, with two oppositely directed tabs 99 struck downward therefrom in spaced relation. A coil tension spring 100 extends between the tabs 99 with its ends hooked over the tabs. Flange 95 is of less length than strip 92a and the latter is provided, within the length of flange 95, with a plurality of narrow rectangular slots 101 arranged as shown, it being noted that certain of these slots are disposed at one side of a line extending parallel with and lengthwise of strip 92a, the other slots being disposed at the other side of such line. At the side opposite to flange 95 strip 92a is provided with an elongated notch 92d of proper length to accommodate the flange of the next adjacent strip. Strip 92b is similar in construction to strip 92a and need not be described in greater detail. Each of the strips 92 is similar in construction to the strips 92a and 92b with the exception that they are not provided with the tabs 99 of the two latter strips. Strip 92c, instead of being of angle cross section, is of channel cross section, being provided at the side thereof opposite to flange 95 with a second upwardly projecting flange 95a having at its upper edge inwardly projecting spaced fingers 96b (Figure 10) similar to fingers 96, flange 95a also being provided, adjacent each end thereof, with fingers similar to fingers 97 for anchoring the ends of a coil tension spring.

Conveniently the slots 101 of the respective closure strips are similarly arranged, as shown in Figure 6. Each of the strips is thus provided with a series of slots and the areas of wall 81 corresponding to the first six strips shown in Figure 10 are provided with slots arranged similarly to and respectively aligned with the slots in these strips. The areas of wall 81 respectively overlying the seventh and eighth strips shown in Figure 10 are provided with slots arranged similarly to the slots of these strips but offset therefrom a short distance toward the left. Setting keys, conveniently formed of flat strip metal, are slidably mounted through the aligned slots of top wall or plate 81 and the strips 92, 92a, 92b and 92c. The setting keys 102 are of the same general construction, it being noted, however, that the portions of the keys which operate through the slots in strip 92c and the next adjacent strip 92 are offset to the right, relative to the portions of these keys, designated 102a, which operate through the slots in plate 81, due to the fact that the slots in plate 81 corresponding to the slots in these two latter strips are offset toward the left relative to the latter slots, as previously noted. A suitable button 103 is secured upon the upper end of each key, as by being forced tightly thereupon or in any other suitable manner, and is spaced an appreciable distance above plate 81. Each key is further provided with a tongue 104 struck therefrom and projecting at right angles thereto toward the next adjacent key, that is, toward the right as viewed in Figure 10. A rubber sleeve 105 fits tightly about tongue 104, this sleeve and the tongue extending between plate 81 and spring 98 associated with the closure strip next adjacent that through which the key operates. The tongues 104 are disposed between fingers 96 and 97 of the closure strips, the keys being appropriately disposed to that end. With respect to the keys which operate through the strip 92c, the tongues and associated rubber sleeves of such keys are confined between the top plate 81 and the tension spring supported by the fingers 96b of flange 95a. It will be seen that the keys are thus normally held in raised position by the tension springs 98.

It will be noted from Figure 8 that each of the closure strips is provided with nine slots 101, it being understood that each strip has associated therewith a series of nine keys. These keys are numbered consecutively from 1 to 9, in order from the front toward the back of the machine, as will be clear from Figure 1. Each key 102 is further provided, adjacent tongue 104, with a forwardly projecting stop element 106 effective for limiting downward movement of the key. The respective keys 102 are also reduced in width, at 102b, adjacent tongue 104, providing an upwardly and rearwardly inclined shoulder 107 adjacent the upper face of top plate 81, in the normal or inoperative position of the key, as shown in Figure 9. A notch 108 is provided in the rearward edge of each key immediately above the shoulder 107. This shoulder and notch cooperate with means for maintaining a depressed key in operative position while eliminating possibility of having two keys of the same series in depressed or operative position at the same time, as will appear presently.

Each of the strips 92, 92a, 92b, and 92c has associated therewith a key-locking bar 110 disposed at the inner face of flange 95 and slidable lengthwise thereof, this bar resting, at its lower edge, upon the upper face of the associated strip. Bar 110 is provided, at its upper edge, with a plurality of detent elements 111 extending at right angles to the bar and disposed adjacent and parallel to the underface of top plate 81. The detent elements 111 normally are held in contact with the rearward edges of the reduced portions 102b of keys 102, by means of a compression spring 112 seating about a stud 113 projecting from the rearward end of bar 110, and confined between the latter and rearward end flange 83 of the housing of the keyboard assembly unit. The rearward ends of springs 112 seat in openings in a metal trip 112a spot welded or otherwise suitably secured to the inner face of the adjacent flange 83.

In Figure 9 one of the keys, designated 102d for purposes of identification, is shown in its depressed or operative position. It will be noted that the associated detent element 111 extends into notch 108 of key 102d, thus locking the latter down. If a second key of this same series be depressed, shoulder 107 thereof will contact the associated detent element 111, in the movement of the second key, designated 102f for purposes of identification, into its depressed position, indicated in dot-and-dash lines, thus shifting the lock bar 110 toward the right, as viewed in Figure 9, disengaging the associated detent 111 from the notch 108 of the depressed key 102d, thus releasing the latter, which is returned to raised or inoperative position by the tension spring 98. Immediately thereafter, key 102f having reached its full operative position, locking bar 110 is moved toward the left by spring 112, thus locking the latter key in operative position. In this manner the keys of any series may be selectively moved into depressed or operative position, in which position they are locked, and the movement of two keys of the same series into operative position at the same time, by first depressing one key and then depressing the second key, is effectively prevented. This is advantageous in that if the operator depresses the wrong key of a series the error is automatically corrected by depressing the correct key of the same series, this depression of the correct key serving to release from operative position the key erroneously depressed and to restore it to inoperative position.

A clearing bar 115 (Figure 7) is slidably mounted within the keyboard housing for reciprocation lengthwise thereof, by means of end studs 115a fitting loosely in slots 115b (Figures 3, 4 and 5) of side flanges 82. The bar 115 has, adjacent each side thereof, an arm 115c extending through an opening 116 in front flange 83 of the keyboard housing. The outer portion of each arm 115c is bent upward to provide a finger 115d which, in the operative position of bar 115, cooperates with means for moving bar 115 for performing a clearing operation, as will be explained more fully later. An upwardly offset finger 115e, conveniently integral with bar 115 extends from adjacent the right side thereof toward the left in spaced parallel relation to the body portion of bar 115. The finger 115e cooperates with means, to be described presently, for normally holding bar 115 in operative position. Forward movement of clearing bar 115 is limited by contact of shoulders 117 and 118 thereof with flange 83.

The forward ends of the key locking bars 110, in the normal positions of the latter, are disposed in proximity to the rearward edge of the clearing bar 115. When it is desired to clear the machine by restoring all of the keys to normal or inoperative position, upon completion of a printing operation or for any other reason, clearing bar 115 is moved rearward forcing the locking bars 110 rearward a sufficient distance to release any keys which may be locked in depressed or operative position. The released keys are immediately restored to inoperative position by the associated tension springs, as above explained.

A clearing yoke 119, of elongated inverted U-shape, is pivoted on the side frame plates 70 and 71, at the front thereof. A bell crank 120 (Figures 12 and 13) is fixed to the left arm of yoke 119. The inner arm 121 of bell crank 120 is offset inwardly and underlies a setting cross rod 176, to be referred to later, for limiting turning of yoke 119 in counterclockwise direction. A tension spring 122, anchored to the outer arm 120a of bell crank 120 and to side plate 71, urges yoke 119 in counterclockwise direction and normally holds arm 121 of bell crank 120 in contact with cross rod 176. An arm 123 is pivoted on cross bar 176, adjacent side plate 71, and extends inward therealong in overlying relation to arm 121 of bell crank 120, upon which it normally rests. Downward movement of arm 123 is limited by a downwardly extending finger 123a thereof, adjacent its outer end, disposed to contact side plate 71, and arm 123 is further provided, at its inner end, with a forwardly offset upwardly extending finger 123b.

A repeat key 124 is slidable through a slot extending transversely of plate 81 adjacent the front and the right hand side thereof, as will be clear from Figure 11. The lower portion of key 124 is reduced in width to provide a shank 126 slidable through slot 127 extending through strip 92a transversely thereof and midway between the tabs 99. The lower end of shank 126 is provided with an upwardly arched notch or recess which receives the upper portion of tension spring 100, the latter being effective for normally holding key 124 in its raised or inoperative position. This key 124 is the repeat key and is provided, at its upper end, with a button 124a suitably secured thereon and bearing the word "Repeat", as shown in Figure 1. Key 124 is further provided, a short distance below button 124a, with a notch 128 which cooperates with plate 81 for locking key 124 in its depressed or operative position, as will appear more fully later. A projection 125, at the same side of key 124 as notch 128, cooperates with plate 81 and strip 92a for limiting upward and downward movement thereof. A finger 124b extends forwardly from the other side of key 124 and underlies finger 115e of the clearing bar 115. When key 124 is raised, finger 124b, in cooperation with finger 115e, holds clearing bar 115 in its raised or operative position, in which the finger 115d of bar 115 is disposed to be contacted by the clearing yoke 119 when the latter is swung in clockwise direction (Figures 12 and 13) for effecting a clearing operation. When the repeat key 124 is latched in its down or depressed position, the clearing bar 115 drops down by gravity to its inoperative position, in which fingers 115d thereof are disposed out of the path of movement of yoke 119, which is then ineffective for clearing the machine. That permits a plurality of checks, all for the same amount, to be printed without necessity for resetting the machine. Suitable means, to be described later, is provided for swinging the clearing yoke 119 clockwise, upon completion of the printing operation, for moving the clearing bar 115 rearward and clearing the machine automatically, when bar 115 is in its operative or raised position.

In cases where it is desired to print a number of checks for the same amount, this automatic clearing of the machine is objectionable, as necessitating setting up of the machine after each printing operation. To avoid that objection I have provided the repeat key and associated means previously referred to. When key 124 is depressed, the clearing bar 115 drops down to its inoperative position as explained above. As key 124 approaches its full depressed or operative position, notch 128 is brought into the plane of plate 81 and key 124 is then shifted slightly toward the right, as viewed in Figure 11, locking repeat key 124 in depressed or operative position.

A clearing key 140, generally similar to the repeat key 124, is slidable through a slot in top plate 81, and is provided with a reduced lower extension or shank 141 slidable through slot 127 of strip 92b. The lower end of shank 141 is provided with an arcuate recess or notch which receives the upper end of finger 123b of arm 123. Downward and upward movement of key 140 is limited by a lateral projection 140a, at the upper end of shank 141, in cooperation with plate 81 and strip 92b. Depressing key 140 swings clearing yoke 119 clockwise or rearward thereby forcing the clearing bar 115, if it is then in raised or operative position, rearward. This movement of the clearing bar 115 serves to force the key locking bars 110 rearward, thus releasing all of the keys which may be depressed, in the respective series or banks of keys. Clearing key 140 is provided, at its upper end, with a button 144 appropriately secured thereon, this button bearing the word "Clear" as shown in Figure 1.

The keyboard assembly unit 80 is supported above the main frame of the machine at an inclination upward and rearward thereof, as shown in Figures 3, 4, and 5. This unit overlies a plurality of similarly inclined setting bars 160, 160a and 160b, slidably mounted for movement lengthwise forward and rearward of the machine. The setting bars correspond in number to the series of banks of setting up keys extending from front to back of the machine and to the corresponding bottom closure strips of the housing for unit 80, extend lengthwise of such strips, and are disposed in the plane of the line of the respective strips extending between the keys thereof, previously referred to. Accordingly, certain of the keys of the respective series or banks will be disposed at one side of the corresponding setting bar, the other keys of such series or bank being disposed at the opposite side of the setting bar. Each of the setting bars has struck therefrom a plurality of stop elements 161 projecting beyond the bar at opposite sides thereof and cooperating with the keys of the associated banks, when in depressed position, for variably limiting forward movement of the respective setting bars from its normal rearward inoperative position.

Figure 15:
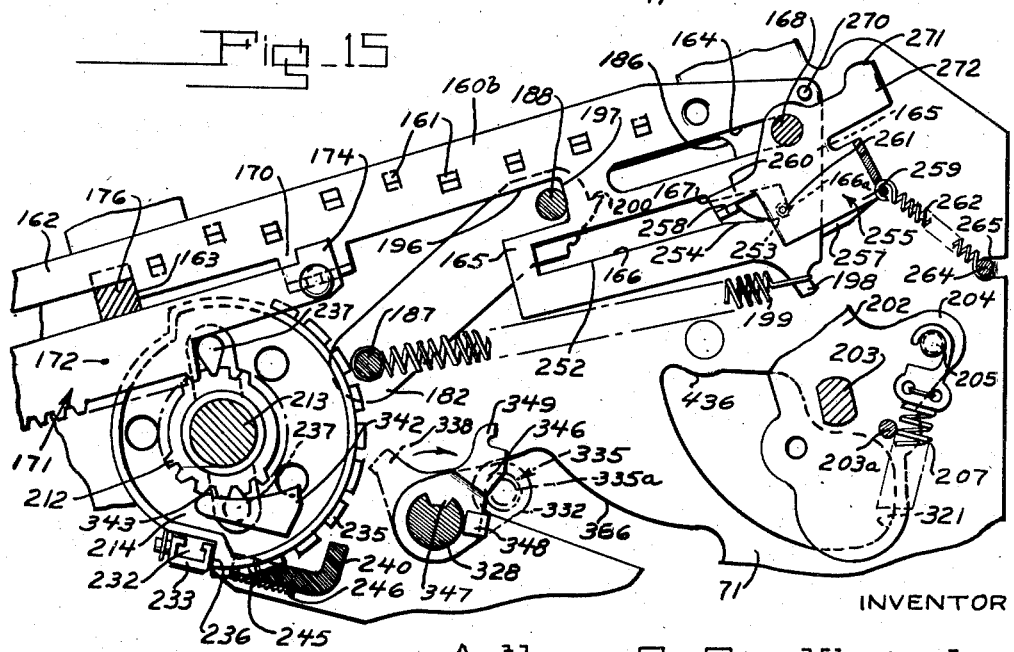
Figure 15 is a fragmentary sectional view on the same order as Figure 14, with the parts of the machine in the positions which they occupy at the end of the setting operation, when no setting key has been depressed.

The arrangement of the setting bars, as assembled in the machine, is shown in Figure 12. These bars are, in general, of similar construction and a detail description of one thereof will suffice. Referring to Figures 13 to 15, inclusive, each of the setting bars is reduced in width at its forward portion to provide a stepped extension 162 and a shoulder 163 at the rearward end of such extension and extending downward from the lower edge thereof to the lower edge of the bar. Each of the setting bars is provided, at the rearward portion thereof, with an elongated lengthwise slot 164 and, below such slot, with a depending extension 165 having therein an elongated lengthwise slot 166 enlarged at its rearward portion at 166a, the upper wall of which is offset downward relative to the upper wall of the main portion of slot 166, providing a shoulder 167. A guide rod 168 is suitably mounted at its ends in the side frame plates 70 and 71 and extends therebetween through slots 164 of the setting bars, serving to guide the latter in the lengthwise movements thereof.

Each of the setting bars 160, 160a and 160b is provided, at its midportion, with a depending L-shaped element 170 (Figures 12, 14 and 15) which projects to one side of the associated setting bar. A rack bar 171 is suitably secured to element 170 and extends forwardly therefrom in spaced parallel realtion to the forward portion of the associated setting bar. The rack bar 171 is provided with a depending rack element 172 comprising a plurality of downwardly directed teeth. At its upper forward portion rack bar 171 is provided with a reduced extension 173 which operates beneath a cross bar 176 extending between side plates 70 and 71 of the main frame, the forward portion 162 of the associated setting rod extending over the rod 176. At its rearward end rack bar 171 is provided with an upwardly extending finger 174. Certain of the rack bars 171 are spaced a considerable distance to one side of the corresponding setting bars, the laterally projecting arm of element 170 being of correspondingly increased length, as shown in Figure 12.

A carriage is mounted below the setting bars for forward and rearward movement relative to the main frame. This carriage comprises two side plates 182 shaped as shown in Figures 14 and 15, disposed at the inner faces of the main frame plates. Plates 182 are connected, adjacent their forward and their rearward ends, by cross rods 187 and 188, respectively, suitably secured therein with their end portions operating in parallel inclined slots 184 and 186 in the frame plates 70 and 71, for guiding the carriage in the movements thereof. Tension coil springs 199 are attached at their forward ends to the cross rod 187 and each spring 199 has its rearward end engaged over a notched finger 198 extending downward and rearward from extension 165 of the associated setting bar. When the carriage is moved forward, each of the setting bars moves forward with it, until a stop element 161 of the settting bar contacts a corresponding depressed key, or shoulder 163 of the setting bar contacts the cross bar 176, if there be no key corresponding to that bar in depressed position; tension springs 199 being of proper strength for that purpose.

Each of the carriage plates 182 is provided with an integral rearwardly extending rack element 200 provided, at its lower edge, with a series of teeth meshing with an arcuate rack 201 at the upper end of an arm 202 secured, a short distance from its lower end, upon a cross rod 203 connecting the main frame side plates 70 and 71 and rockably mounted therein. The arms 202 are further connected by a second cross rod 203a and each arm 202 is provided with a rearwardly projecting finger 204 in which is secured an inwardly extending circumferentially grooved pin 205. A similar pin 206 is secured in the adjacent main frame side plate and projects inward therefrom adjacent the lower edge thereof. A tension coil spring 207 extends between the pins 205 and 206 with its ends anchored thereto. The springs 207 yieldingly urge arms 202 in clockwise direction, as viewed in Figure 13, for returning the carriage to its rearward position.

Rock element 172 of each of the rack bars 171 meshes with a spur pinion 212 rotatably mounted upon a shaft 213 extending between the main frame plates 70 and 71 and suitably mounted therein, as shown more clearly in Figure 19, this shaft being disposed adjacent the front of the machine. Pinions 212 are disposed adjacent and between printing segments, also mounted for turning movement on shaft 213, these segments being arranged in two groups, one group comprising six segments 214, which may be referred to as the dollars segments, and the other group comprising two segments 215, which may be referred to as the cents segments. A cents bar 216 is mounted, at its upper end, upon shaft 213, between frame plate 70 and pinion 212 disposed at the right hand cents segment 215, as viewed in Figure 19. A stud 217 is secured in frame plate 70 and fits into a corresponding recess in bar 216, confining the latter against turning movement on shaft 213. At its lower end bar 216 is provided with a printing element 218 which bears the abbreviation "cts." in reversed serrated letters, for printing the accepted abbreviation for cents. Bar 216 is further provided, at its top, with an upwardly projecting flange 219, which cooperates with the adjacent printing segment 215 to guide the rack bar meshing with pinion 212 disposed between the latter segment and bar 216. A dollars bar 220, similar to bar 216 except that it bears at its lower end the abbreviation "Dols.", for dollars, is mounted upon shaft 213 between the left hand printing segment 215 and the pinion 212 at the right hand face of the right hand printing segment 214. Bar 220 is provided with an upwardly projecting flange 221 which cooperates with the adjacent segment 214 for guiding the rack bar meshing with pinion 212 disposed between the latter segment and bar 220. Conveniently, the pinions 212 associated with the first three of the printing segments 214 are disposed to the left of the latter and the pinions associated with the remaining printing segments are disposed to the right thereof, the third and fourth segments 214 being properly spaced apart by a spacing member 222 disposed about shaft 213. The printing segments and the associated pinions may, of course, be otherwise suitably arranged.

A prefix bar supporting member 225 is mounted upon shaft 213, at the inner face of frame plate 71, the inner end of this supporting member being recessed concentrically with shaft 213 for reception of an abutment member 226, conveniently a split key or washer engaging into a corresponding circumferential groove in shaft 213. A spacing collar 227 extends about shaft 213 between the inner end of supporting member 225 and a guide plate 228, confined between member 227 and pinion 212 at the left of the first printing segment 214, plate 228 projecting upward above the pinion and cooperating with the latter segment for guiding the rack bar meshing with the pinion. Plate 228 projects downward beyond spacing collar 227 and is notched at its lower end for reception of an extension 230 of supporting member 225, at the lower end thereof, extension 230 being substantially square in cross section and the notch in the lower end of plate 228 being rectangular and fitting about the upper portion of extension 230. Plate 228 is thus confined against turning movement about shaft 213. The supporting member 225, including extension 230 thereof, provides means for slidably supporting a prefix bar, as will be described more fully later, this prefix bar and the printing elements of bars 216 and 220 being aligned transversely of the machine on the printing line thereof.

Support 225 is provided with a depending rib 232 of substantially T-shape in cross section, this rib depending in part from extension 230. A prefix bar 233, provided with a lengthwise interior channel conforming to rib 232 is slidably mounted upon this rib. Bar 233 is provided, on its under face, with a plurality of serrated printing characters or letters spelling the words "The sum." Side frame plate 71 is provided with a notch 234 which accommodates the outer portion of prefix bar 233 in the movement thereof. The printing segments 214 and 215 are shaped as shown in Figures 13, 14 and 15 and each bears upon its circumferential surface a plurality of printing characters 235 marked from "0" to "9," inclusive, as in Figure 19. Each of the printing segments is provided with a shoulder 236 adjacent the zero character thereon, as shown. Each of the dollars and the cents segments is provided, at the side thereof toward its associated pinion 212, with two diametrically opposite detents 237 each having a toothed element which fits snugly between two adjacent teeth of the pinion. In this manner, the respective printing segments are keyed to their associated pinions for turning movement therewith. The prefix bar supporting member 225 is confined against turning movement about shaft 213 by means of a stud 238, secured in plate 71, in the same manner as the cents bar 216 is confined against turning movement. A rear segment guide bar 240 extends between the main frame plates 70 and 71, with its end portions bent upward at 241 and appropriately secured in these plates. The dollars bar 220 is suitably anchored to bar 240 so as to be confined against turning movement about shaft 213. Bar 240 is of angle cross section, for desirable strength and rigidity, and is provided with a plurality of slots 245, extending from its forward edge, which receive the rearward portions of the printing segments for guiding the latter in the movement thereof.

A serrated perforating plate 246 is secured upon the lower face of bar 240 and cooperates with a perforating platen, in a manner to be later described, for perforating the "Payee" area of the check.

Referring to Figures 13, 14 and 15, rack element 172 of each of the rack bars 171 is provided with twelve teeth defining therebetween eleven notches. In the normal position of a rack bar and its associated segment, shown in Figure 13, the front notch of rack element 172, defined by the two front teeth thereof, receives a tooth of the associated pinion 212, the remaining teeth of the rack element being out of engagement with the pinion. Normally, the first five printing segments are so disposed that the "9" character of each thereof is on the printing line of the machine, the central plane of which printing line radially of shaft 213 is indicated by the line a—b in Figure 14, as shown in Figure 13, and the remaining three printing segments are so disposed that the "9" character of each thereof is disposed one space in advance of the printing line. In the operation of the machine the carriage travels a predetermined distance forward and then rearward during each operation. Referring to Figure 14, let it be assumed that the number "7" key, designated 102d for identification, in the third row from the left as viewed from the front of the machine, is depressed. Setting bar 160b moves forward with the carriage two spaces, until stop element 161 of this bar contacts the key 102d, it being noted that the seventh element 161 from the front of bar 160b is the one which contacts the depressed number "7" key, thus turning printing segment 214 counterclockwise through a distance of two spaces and positioning the printing character "7" on the printing line of the machine, as shown. Contact of stop element 161 with key 102d stops forward movement of bar 160b. In the continued forward travel of the carriage relative to the setting bar, the tension of spring 199 is increased thereby assuring that the setting bar will be held in its forward position as limited by the depressed key. In like manner, a segment may be adjusted for positioning upon the printing line any other character thereof corresponding to a depressed key. It will be noted that the adjustment of the segment is effected in a positive manner which assures accuracy and eliminates possibility of either overthrow or underthrow of the printing segment due to rapid operation of the machine.

During the return movement of the carriage the cross bar 188 enters slot 196 of the respective setting bars and contacts shoulder 197 at the rearward end of this slot, thus picking up the setting bars and positively returning them to their normal rearward position, it being noted that rearward movement of the setting bars, and of the carriage, is positively limited by contact of the setting bars, at the forward ends of slots 164 thereof, with cross rod 168. The return of the setting bars to normal positions serves to return the printing segments to normal positions, in an obvious manner.

It will be noted that no keys are provided for effecting zero setting of the respective printing segments. That is taken care of by means which will now be described.

The zero setting of the three last printing segments will be considered first. As previously noted, when these segments are in normal position, the "9" printing character of each thereof is disposed one space in advance of the printing line. When the corresponding setting bars are moved forward to their maximum extent, these segments are turned through a distance of eleven spaces, thus disposing the "0" printing characters thereof on the printing line. Assuming that no setting key has been depressed for any one of the last three printing segments, during forward movement of the carriage the corresponding setting bars 160 and 160a move forward with the carriage until the shoulders 163 of these setting bars contact cross bar 176. In that manner, the last three segments are moved into zero printing position, in which position they are held by the tension springs 199 so long as the carriage remains in its forward position. In the rearward return movement of the carriage the setting bars and the corresponding printing segments are returned to their normal positions, in the manner previously described.

The first five dollar printing segments normally are disposed with the "9" characters thereof on the printing line of the machine, as above noted. In order that checks may be printed for round numbers of dollars, as for ten dollars and multiples thereof, I provide interlock means for assuring that when a setting key corresponding to the first, second, third, or fourth dollars segment is depressed, the dollars segment or segments to the right of that one corresponding to the depressed key will be adjusted into zero position, adjustment of the last, or sixth dollars segment into zero position being provided for in the manner above described.

Referring to Figures 13 to 16, inclusive, the lower edge of slot 166 in extension 165 of each of the setting bars 160b comprises a straight portion 252 of considerable length and a relatively short rearward straight portion 253, the forward end of which is connected to the rearward end of portion 252 by a forwardly and upwardly inclined shoulder 254. Stirrups 255, of elongated U-shape in plan, are rockably mounted upon cross rod 168 between the setting bars 160b. The left hand arm 256, the lower arm in Figure 16, of each stirrup 255 is provided with a forwardly and upwardly curved element 257 the upper portion of which is bent at right angles to provide a finger 258, which projects through slot 166 in extension 165 of the adjacent setting bar 160b. The right hand arm of each stirrup 255, the upper arm in Figure 16, designated 259, is provided with a forwardly projecting reduced finger 260, which overlies finger 258 of the next adjacent stirrup 255 to the left, as viewed from the front of the machine. It will be noted that the fingers 260 of the central and the lower stirrup of Figure 16 overlie the fingers 258 of the upper and the central stirrup, there being no finger 260 overlying the finger 258 of the lower stirrup and there being no finger over which finger 260 of the upper stirrup extends. A pin 261 is secured in arm 259 of each stirrup 255 and projects therefrom through slot 166 in extension 165 of the adjacent setting bar 160b, overlying but out of contact with extension 257 of the next adjacent stirrup. A tension coil spring 262 is attached, at its forward end, to the bight portion of each stirrup 255 adjacent the lower edge thereof, the rearward end of this spring being anchored to a cross rod 264 extending across the main frame and seating at its ends in notches 265 in the rear edges of frame plates 70 and 71. Tension springs 262 urge the stirrups 255 upward about cross rod 168 in a counterclockwise direction as viewed in Figure 14. In the normal positions of the setting bars 160b, pins 261 rest upon the forward straight lower edge portions 252 of slots 166 of the first, second, third and fourth setting bars 160b, respectively, holding stirrups 255 in their normal position with fingers 258 thereof projecting through slots 166 of the second, third, fourth and fifth bars 160b, in contact with the upper edge of the respective slots and in advance of the respective shoulders 167. Referring to Figure 14, if no setting key be depressed for limiting forward movement of any one of the setting bars 160b, these bars will move forward with the carriage in the forward movement of the latter until the pins 261 pass off of the forward straight lower edge portion 252 of slot 166 onto the inclined shoulder 254, of the first, second, third and forth setting bars 160b. That occurs before shoulders 167 of the second, third, fourth and fifth bars 160b contact the fingers 258. Stirrups 255 are then swung upward, in counterclockwise direction as viewed in Figure 15, into the position shown in this figure. This upward movement of the stirrups swings the fingers 258 downward so as to clear the shoulders 167, permitting continued and maximum forward movement of bars 160b with the carriage. Under such conditions, the first five dollar printing segments will each be turned through a distance of eleven spaces into position with the shoulder 236 thereof disposed in alignment and one space in rear of the printing line of the machine, to accommodate the prefix bar 233, as shown in Figure 15. If, on the other hand, a setting key be depressed for limiting forward movement of the first setting bar 160b, forward movement of that bar will be limited to a distance determined by the key depressed, such distance being, in any case, less than that required to bring the inclined shoulder 254 of slot 166 of the first setting bar beneath pin 261 extending through that slot. Accordingly, the stirrup 255 between the first and the second setting bars will be held against movement, and the remaining three stirrups will also be held against movement of the fingers 258 and 260. Under such conditions, the first setting bar 160b will be moved forward the distance permitted by the depressed key, the first dollars segment being thus adjusted for positioning the selected printing character thereof on the printing line of the machine, and the second, third, fourth and fifth setting bars 160b will move forward with the carriage until the shoulders 167 thereof contact fingers 258 of these latter bars. When that occurs, the second, third, fourth and fifth bars 160b have been moved forward such a distance that the corresponding printing segments have been turned into "0" printing position, shoulders 167 being properly disposed for that purpose, and these bars are thereafter held against forward movement in the continued forward travel of the carriage. In that manner, the second, third, fourth, fifth and sixth dollars printing segments are moved into zero printing position, when a key is depressed for limiting forward movement of the first dollars setting bar, without depressing a key for limiting forward movement of any other of the dollars setting bars, the adjustment of the second, third, fourth and fifth dollars segments being effected by the interlock means, in the manner just described, and the zero adjustment of the sixth dollars printing segment being effected in the manner previously described. Also, if no key is depressed for effecting adjustment of either of the "cents" segments they will be turned into zero printing position, in the manner previously described. In the same manner, if a key be depressed for limiting forward travel of the second setting bar 160b, the first bar 160b may move freely with the carriage for the full extent of the forward movement of that bar, and the first dollars segment is turned to maximum extent into position with shoulder 236 thereof one space in back of the printing line, the third, fourth and fifth dollars printing segments being set in zero printing position under control of the interlock means, and the second dollars printing segment being adjusted according to the corresponding key depressed. If a key be depressed for limiting forward travel of the third bar 160b, the first and second dollars printing segments are turned into positions with the shoulders 236 thereof disposed one space in back of the printing line, the third segment is adjusted in accordance with the depressed key, and the fourth and fifth segments are adjusted into zero printing position, by means of the interlock, the sixth dollars printing segment being adjusted into zero position in the manner previously described. It will thus be seen that if a key be depressed for setting any one of the first five of the dollars segments, without depressing a key for setting any other of the dollars segments, the dollars printing segments to the right of the segment corresponding to the depressed key will be adjusted into zero printing position automatically, in the operation of the machine. That eliminates necessity for providing zero setting keys.

A setting bar 160b which has been moved forward to its full extent with the carriage, is returned to normal position with the latter in the manner previously described. During the first part of such rearward movement of the setting bar, pin 261 travels along the rearward straight portion 253 of the lower edge of slot 166 and then enters upon the shoulder 254. It is preferable that pin 261 not remain in close contact with this shoulder. Accordingly, each of the first, second, third and fourth setting bars 160b is provided, adjacent its rearward upper corner, with a pin 270 projecting toward the next adjacent bar. In the forward movement of the bar, pin 270 passes above an upward extension 271 at the rearward end of a finger 272 projecting rearward from arm 259 of the adjacent stirrup 255. When the stirrup is turned counterclockwise about cross rod 168, into its position shown in Figure 15, finger 272 and extension 271 thereof are disposed in the path of movement of pin 270, as the bar 160b approaches its rearmost position. This pin is so disposed that it contacts finger 272 adjacent extension 271 thereof, at the time that pin 261 enters upon the inclined shoulder 254, swinging the stirrup 255 in a clockwise direction, as viewed in Figure 15, and raising pin 261 out of contact with shoulder 254, holding it thus raised until after shoulder 254 passes beneath the latter pin.

The machine may be operated in any suitable manner, conveniently by means of an operating lever 275 provided at one end with a suitable handle 276. Referring to Figures 3 and 17, lever 275 is mounted, at its other end, upon a flattened element 277 of a shouldered hub 278 rockably mounted upon a stub shaft 279, suitably secured in frame plate 70 adjacent the mid-portion thereof. Element 277 of hub 278 is of non-circular cross section, being flattened at opposite sides as shown in Figure 3, the end of lever 275 seating against the shoulders thus provided at the outer end of hub 278. An exteriorly threaded tubular element 280 extends outward from element 277 and contacts, at its outer end, the head of a screw 281 threaded into stub shaft 279, the hub member 278 being confined between the head of this screw and a circumferential shoulder or flange 282 extending about stub shaft 279 and seating against the outer face of plate 70. A nut 283 screws upon element 280 and cooperates with a lock washer 284, of known type, confined between the inner end of this nut and the outer face of lever 275, for securing the end portion of this lever upon element 277, and a cap nut 283a is screwed upon the outer end of element 280. It will be clear that turning movement may be imparted to hub 278, by means of the operating lever 275.

The inner end portion 285 of hub 278 is reduced in diameter and has secured thereon an outer cam member 286 and an inner cam member 287. Cam 286 is of approximately segmental shape, as shown in Figure 3, and is provided with an arcuate notch 288 in its lower edge and adjacent its rearward end. Cam 287 has a circumferential surface comprising a portion 289 concentric with the axis of stub shaft 279, a second portion 290 also concentric with the stub shaft 279 but of less radius than portion 289 and connected to one end thereof by a shoulder 291, and a substantially flattened portion 292 connecting the other end of portion 290 to the other end of portion 289.

A cylindrical stud 295, carrying a roller 295a is secured to cam 286 at about the mid-portion thereof, above notch 288 and at a slightly less radial distance from the stud shaft 279 than the notch, this stud projecting outward from cam 286. In the normal position of the latter cam, shown in Figure 3, notch 288 receives the end portion of a pintle rod 296 of a toggle lever structure, to be later described. Rod 296 also extends through an arcuate slot 297 in an arcuate element 298, at the rearward portion of a link 299 pivoted at 300 to a tail element 301 extending from cam 286, at the opposite side of stub shaft 279 from stud 295. Tail piece 301 is provided, at the lower portion of its inner face, with an inwardly projecting block 302. This block is disposed to contact a stud 303 secured to the main frame side plate 70, for limiting turning movement of cam 286 from its normal position, as shown in Figure 4.

In the normal position of cam 286, the roller 295a on stud 295 engages in a slot 305 at the lower edge of a lever 306 pivoted upon a pin 307 secured in plate 70, this pin being provided with a circumferential groove receiving a resilient key or lock member of arcuate shape and of known type, designated 308, confining lever 306 against outward movement on pin 307. A headed pin 309 is secured to the forward end of lever 306, projects therefrom toward plate 70, and has a roller 310 mounted thereon. This roller is disposed for contact with the circumferential cam surface of cam 286 in the movement of the latter from its normal position shown in Figure 3 into its position shown in Figure 4. At its rearward end, lever 306 is pivotally and adjustably connected to the upper end of a link 312, by suitable known means comprising a headed screw 313 having an eccentric 314 of cylindrical shape fitting through a corresponding opening in lever 306 and a reduced cylindrical element 315 fitting through a corresponding opening in link 312, there being a securing nut (not shown) threaded upon a reduced screw stud (not shown) projecting from element 315 coaxially therewith. By turning screw 313, the effective length of the stroke of link 312, incident to operation of lever 306, may be varied as desired, within limits, to assure accuracy of operation of parts actuated by link 312.

The lower end of link 312 is pivotally connected to the lower portion of arm 202, disposed at the inner face of the main frame side plate 70, by means of a pin 320 secured in arm 202 and projecting outward therefrom through an opening 321 in plate 70 and through the lower end of link 312, this pin being circumferentially grooved and receiving a key member 322 of known type effective for confining the link 312 against movement outward of pin 320.

When lever 275 is swung in counterclockwise direction, as viewed in Figures 3 and 4, cam 286 is turned in the same direction, as indicated by the arrow in Figure 4. During the first part of the forward movement of the cam 286, roller 295a on stud 295 contacts lever 306, swinging the latter clockwise and, in the continued movement of the cam 286, the dwell thereof passes beneath roller 310, at which time stud 295 passes out of contact with lever 306, which is then held in the position shown in Figure 4 throughout the remainder of the forward movement of the cam 286. Movement of lever 306 into the position shown in Figure 4 forces the link 312 downward, thus swinging the arm 202 forward about the axis of cross rod 203, moving the carriage forward and effecting setting of the printing segments in the manner previously described. The carriage is maintained in its full forward position, by means of cam 286, until after completion of the printing operation, as will be described later.

It is desirable that the printing segments be locked in accurate alignment on the printing line of the machine during the printing operation. Means for accomplishing that result is provided. An aligned shaft 328 (Figures 17 and 18) extends between the main frame side plates 70 and 71, below and adjacent stub shaft 279, and is provided at each end with a reduced stud 329, these studs extending through plates 70 and 71 and supporting shaft 328 therein for rocking movement. Shaft 328 is further provided, adjacent plate 70, with a reduced element 330 providing a shoulder 331 on shaft 328, spaced inward a short distance from the inner face of plate 70. That arrangement will be clear from Figures 17 and 18. An operating lever 332 is mounted upon element 330 and is provided with a tooth 333, of flattened V-shape, which fits tightly into a corresponding groove 334 extending lengthwise of shaft 328. Lever 332 is thus keyed upon shaft 328 and extends upward and rearward therefrom. At its rearward end lever 332 is provided with a pin 335 secured therein and projecting therefrom outward through the forward portion of a slot 336 in frame plate 70, as will be clear from Figure 3. Beyond the outer face of plate 70 pin 335 is reduced in diameter to provide a stud 335a upon which is mounted a roller 337 corresponding in diameter to the body of pin 335. This roller 337 contacts the circumferential surface of cam member 287, as will be clear from Figure 3, and is confined against outward movement on pin 335 by the cam 286, as will be clear from Figure 17. Lever 332 is further provided with a forwardly and upwardly extending finger 338 having an inwardly bent terminal element 339 to which is attached the upper end of a coil tension spring 340. The lower end of spring 340 is anchored to the adjacent upwardly bent end portion 241 of the angle cross bar 240. Tension spring 340 thus urges lever 332 and shaft 328 in counterclockwise direction, as viewed in Figure 18, holding roller 337 in contact with cam 287.

Printing segment aligning and locking arms 342, corresponding in number to the pinions 212, are mounted upon the aligning shaft 328 and project forwardly therefrom above the cross bar 240, the lower edges of these arms being appropriately notched to accommodate the rearward flange of this bar. Arms 342 are disposed in the planes of the respective pinions 212 and each arm is provided, at its forward end, with an upwardly projecting tooth 343 disposed and adapted to fit accurately between two adjacent teeth of the corresponding pinion 212, when arm 342 is in its raised position, as shown in Figure 15. Referring to Figures 14 and 15, each arm 342 is further provided with a tooth element 344, appreciably narrower than and extending into groove 334 of the aligner shaft 328. A holding arm 346 is mounted upon shaft 328, adjacent each of the arms 342, and is provided with a tooth 347 fitting snugly in groove 334, whereby the arms 346 are keyed to shaft 328 for movement therewith. Each holding arm 346 is further provided with an element 348 of substantially U-shape in plan, which extends about the rearward portion of the adjacent arm 342, effective for confining the arms 342 and 346 against relative movement lengthwise of shaft 328 while permitting relative movement of these arms about the axis of this shaft. Arm 346 extends upward and rearward from shaft 328 and is provided, at is upper end, with a rearwardly opening hook element 349 to which is attached one end of a coil tension spring 350. The other end of spring 350 is attached to a forwardly opening hook element 351, extending from the upper portion of the segment aligner and locking arm 342.

In the normal position of cam 286, shown in Figure 3, cam 287 occupies the position shown in the latter figure, shaft 328 being then held by tension spring 340 in such position that the arms 342 are in their normal lowered inoperative position, shown in Figures 13 and 14. In that position of arms 342 the rearward edge of tooth 344 of the respective arms 342 is in contact with the rear wall of groove 334 of shaft 328, leaving an appreciable space between the forward edge of tooth 344 and the forward wall of groove 334, as shown in Figures 13 and 14. During the first part of the movement of cam 286 in the direction indicated by the arrow in Figure 4, while lever 306 is being raised by stud 295, portion 292 of the dwell of cam 287 is in contact with roller 337 and no appreciable rocking movement is imparted to the aligner shaft 328. That will be clear from Figure 3. After lever 306 has been fully raised into the position shown in Figure 4, and the carriage has been moved into its forwardmost position, as previously explained, roller 310 passes onto the dwell of cam 286, after which portion 289 of the dwell of cam 287 contacts roller 337, thus turning the aligner shaft 328 in a clockwise direction, as viewed in Figures 14 and 15, raising arms 342 so that the tooth 343 of each of the latter arms engages between two adjacent teeth of the corresponding pinion 212, as shown in Figure 15. Referring to Figure 14, it will be noted that there is some clearance space between the forward edge of tooth 344 and the forward wall of groove 334 in shaft 328, arm 342 being held raised solely by the tension of spring 350. In that manner the segment aligning and locking arms have a floating mounting on shaft 328 and are yieldably held raised by the tension spring 350, which accommodates such slight movement of arms 342 as may be necessary in accurately aligning and locking the printing segments. In this manner, the printing segments are accurately aligned with respect to the printing line of the machine and are locked in such alignment, immediately after they have been adjusted incident to the forward movement of the carriage, this aligning and locking of the segments occurring preliminarily to the printing operation. In the return movement of cam 286, after completion of the printing operation, portion 292 of the dwell of cam 287 is brought into contact with roller 337 slightly in advance of the dwell of cam 286 passing out of contact with roller 310. The aligner shaft 328 is then returned to normal position, by the tension spring 340, moving the aligner and locking arms 342 downward into inoperative position and releasing the pinions 212 and the associated printing segments. Shortly thereafter, the dwell of cam 286 passes out of contact with lever 310, at which time stud 295 is disposed for contact with lever 306 and, in the continued return movement of cam 286, the carriage is returned to normal position, the setting bars and associated parts of the machine also being returned to normal positions.

A printing platen 355, shown more clearly in Figures 4 and 13, cooperates with the printing characters aligned on the printing line of the machine, during the printing operation, the upper face of this platen being serrated and cooperating with the serrated printing characters for shredding the area of the check printed upon. Platen 355 is mounted in a holder 356 suitably secured, as by welding, upon the upper face of a bar 357 of rectangular cross section slidable, at its ends, in slots 358 extending from the upper edges of two supporting and operating levers 359, adjacent the forward ends thereof, spaced inward a short distance from the main frame side plates 70 and 71. Bar 357 may be adjusted, and secured in adjustment, by screw means of known type associated with a bar 360 extending between the levers 359, adjacent the forward ends thereof, and secured thereto in a suitable manner. Levers 359 are secured upon a stepped shaft 361 rockably mounted at its ends in plates 70 and 71. Links 363 are pivoted at their lower ends, at 364, to the rearward ends of levers 359 and extend upward therefrom. Each link 363 is provided with a lengthwise slot 365 extending from its upper end and receiving toggle pintle rod 296, the end portions of which project through slot 336 (Figures 3 and 4) in frame plate 70 and a corresponding slot 366 in frame plate 71. Pintle rod 296 also extends through two bearing sleeves 367 at the ends of the lower edge of a toggle leaf 368 pivoted at its upper edge, by means of studs 369, in the frame plates 70 and 71. A tension coil spring 372 is attached at its upper end to pintle rod 296, adjacent frame plate 71, and has its lower end attached to pivot pin 364, which projects from lever 359 toward frame plate 71. Tension spring 372 thus tends to collapse the toggle comprising the leaf 368 and the links 363.

When the operating lever 275 is swung forward and downward, the printing segments are aligned and locked in accurate alignment on the printing line of the machine, in the manner previously described, after which link 299 contacts pintle rod 296, at the forward end of slot 297, forcing this pintle rod rearward from the position shown in Figure 3 into the position shown in Figure 4. This swings the toggle leaf 368 downward and rearward, swinging the links 363 rearward and upward slightly, after which the pintle rod 296 contacts the links 363 at the lower ends of slots 365 thereof, continued rearward movement of pintle rod 296 serving to extend the toggle and force the rearward ends of levers 359 downward, thus swinging the platen 355 upward into cooperating printing relation to the characters aligned on the printing line of the machine, as shown in Figure 4. It will be understood, of course, that the check is inserted into the machine preliminary to the downward and forward movement of the operating lever, and that the desired characters are printed upon the check, upon movement of platen 355 into printing position, the area of the check printed upon being shredded by the serrated printing characters and the serrated printing platen. In the return movement of the operating lever, link 299 is returned to its normal position shown in Figure 3, tension spring 372 functioning to collapse or fold the toggle lever structure and also to swing the forward ends of levers 359 downward, returning printing platen 355 to its normal inoperative position shown in Figures 3 and 13.

Preferably, means is provided for assisting in breaking the toggle after the printing platen has been moved into printing position. Referring to Figures 3, 4 and 12, a shouldered stud 375 is secured to frame plate 70, adjacent the rear edge thereof and projects inward therefrom. Toggle leaf 368 is provided with a slot 376 through which extends the forward end portion of a rod 377 provided, at its lower end, with an enlarged flat head 378 pivotally mounted upon stud 375. A coil compression spring 379 is disposed about rod 377 and seats, at its lower end, upon the shoulders of head 378. Spring 379 is of such length that the upper end thereof is spaced a short distance rearward of leaf 368 when the toggle structure is in its broken, or folded condition shown in Figure 13. As leaf 368 swings downward and rearward, during extension of the toggle, it contacts the upper end of spring 379 and places the latter under compression such that the pressure exerted by this spring is considerable when the toggle has been fully extended. The spring 379 is thus effective, during the first part of the return movement of the operating lever 275, for assisting in breaking the toggle and causing forward and upward movement of toggle leaf 368.

Perforating plate 246 cooperates with a perforating platen 380 disposed within a suitable holder 381, as in Figures 4 and 13, and slidably mounted in notches extending from the upper edges of two supporting and operating levers 382 rockably mounted upon shaft 361 and spaced inward thereof a short distance from the levers 359. The perforating platen 380 is held in position and adjusted by means of two screws 383, slidable through a flat cross strip 384 connecting levers 382 and secured at its ends therein, these screws threading into platen 380, there being a compression coil spring 385 disposed about each screw 383 and confined between holder 381 and strips 384. Platen 380 is thus yieldingly held in raised position. Upon its upper face the perforating platen 380 is provided with suitably arranged serrations or perforating point which, if desired, and preferably, define the letters spelling the word "Insured," the suitable figures at each end of the word. Each lever 382 is provided, a short distance from its rearward end, with a bayonet slot 387 which receives a reduced stud 388 at the end of a cross rod 389 extending between levers 382. Studs 388 also extend through the lower ends of links 390 which extend upward and outward from levers 382, the lower ends of links 390 being confined against outward movement along studs 388 by suitable known means. The toggle pintle rod 296 passes through the upper ends of links 390, as will be clear from Figure 13, so that when the toggle structure is extended, for swinging the printing platen 355 upward into printing position, the perforating platen 380 will also be swung upward. When the studs 388 are in the lower portions of the bayonet slots 387, however, as shown in Figure 4, the upward movement of platen 380 will be insufficient to bring it into cooperating relation to the perforating plate 246, this platen then occupying the position shown in Figure 4 when the printing platen 355 has been raised into full printing position. To assist in returning the perforating platen 380 to its lowered inoperative position, a coil tension spring 392 has its ends attached to toggle leaf 368, adjacent the ends thereof, and is passed under a cross rod 393, extending between and mounted in the upwardly curved rearward portions of levers 382.

An angle strip 394 is secured at its forward end to cross rod 389, at the mid-length thereof, by means of a headed stud 395. Strip 394 is provided, adjacent its rearward end, with a slot 396 through which extends a pin 397 secured, at its upper end, in a rod 398 extending between and rockably mounted in the main frame side plates 70 and 71. Shaft 398 projects outward beyond plate 71 and beyond the enclosing casing of the machine (Figures 1, 2 and 5), the end of this portion of the shaft being cut away at opposite sides to provide a substantially squared element 399 which fits snugly through a corresponding opening in the lower end of an operating lever 400, secured thereon by a headed screw 401 threading into element 399 and shaft 398. A suitable button or grip 402 is secured upon the upper end of lever 400. Again referring to Figure 13, abutment members 403 are secured upon pin 397 above and below strip 394 in proximity thereto. By turning shaft 398 in counterclockwise direction, as viewed in Figure 13, pin 397 is brought into contact with strip 394 at the rearward end of slot 396, and in the continued turning of shaft 398 cross-rod 389 is forced rearward, depressing levers 382 against the tension of spring 392, until studs 388 are aligned with the upper portions of the bayonet slots 387, which the studs then enter with a snap action. In that position of the cross rod 389, perforating platen 380 will be raised into full operative position and will cooperate with the perforating plate 246 for perforating the "Payee" area of the check. With the studs 388 of the cross rod 389 in the upper portions of the bayonet slots 387, movement of perforating platen 380 into cooperating relation to the perforating plate 246 will occur in advance of movement of the printing platen 355 into full printing position, due to the fact that the slots 365, in the upper ends of links 363, provide a lost motion connection which assures raising of platen 380 in advance of platen 355. That is of advantage in that the payee area of the check is perforated by the platen 380 and the plate 246, and the check is then held in position by the payee area platen during the subsequent printing operation. While the payee area perforating means is used under ordinary conditions, there may be cases where it is not desired to use such means, in which event cross rod 389 is moved forward sufficiently to dispose the studs 388 in the lower portions of the bayonet slots 387, thus disabling the payee area perforating means in the manner previously described. We thus provide means whereby the payee area perforating means may be disabled and enabled, as required or desired.

Referring to Figures 5, 12, 19 and 20, the outer portion of prefix bar 233 is of angle cross section providing, at the front thereof, an upwardly extending flange 410 in which is secured, adjacent the outer end of the bar, a stud 411 which projects forwardly from flange 410. This stud extends through a corresponding notch in a link 412, which projects through notch 234 in frame plate 71 and is pivoted adjacent its inner end, at 413, to the lower end of a prefix bar shift lever 414. This lever 414 is pivoted, adjacent its upper end, at 415, on the prefix bar supporting member 225. At its upper end lever 414 is provided with an upwardly and outwardly extending bill 416 projecting through a slot 417 extending from the upper edge of plate 71. Adjacent its lower end lever 414 is provided with an outwardly bent element 418 which, in the normal position of the lever, shown in Figure 19, extends into a slot 419 in plate 71. Supporting member 225 is provided, at its inner end, with an upwardly projecting finger 420 in which is secured a forwardly projecting circumferentially grooved pin 421. A tension coil spring 422 is attached at its upper end to pin 421 and has its lower end attached to a perforated ear 423 of lever 414, at the inner edge thereof and a short distance below the pivot 415. Link 412 preferably is provided, at the inner end thereof, with an angularly disposed tab 424 which extends across the inner edge of lever 414 for limiting downward movement of the outer end of link 412, when the latter is disengaged from stud 411. Tension spring 422 provides means for yieldingly urging the lever 414 in counterclockwise direction about pivot 415, as viewed in Figures 19 and 20, for moving the prefix bar 233 inward toward the printing segments, to variable extent, while permitting of this bar and shift lever 414 being held in their normal positions, shown in Figure 19.

In the normal position of shift lever 414 the lower edge of bill 416 thereof extends across and contacts the upper edge of a bill 425 of a control lever 426 (Figure 5) which bill 425 extends across slot 417. Control lever 426 is pivoted, at 427, on frame plate 71, at the outer face thereof, and is of angle formation as shown. Immediately in rear of bill 425, lever 426 is provided with a transverse arcuate slot 428 which receives a stud 429 secured in and projecting outward from plate 71, there being a washer 430 disposed about this stud, at the outer face of lever 426, and confined against outward movement by a key or abutment member 431 of known type, which engages in a circumferential groove in stud 429. Lever 426 is further provided with a rearwardly and downwardly inclined arm 432, the rearward end of which is inclined upwardly and forwardly at 433, as shown. When the toggle structure of the machine is in its normal broken or collapsed condition, the end portion of pintle rod 296, which projects through slot 366, contacts the upper edge of arm 432, depressing this arm and holding bill 425 in raised position, as shown in Figure 5, thus holding the shift lever 414 and the prefix bar 233 in their normal positions shown in Figure 19. When the machine is operated for printing and the toggle structure is extended, pintle rod 296 moves from its normal position shown in Figure 5 rearward. This movement of the rod 296 releases arm 432 of lever 426 and permits bill 425 thereof to be depressed by bill 416 of the shift lever 414, under the influence of tension spring 422. That does not occur, however, until after the printing segments have been adjusted and locked in adjustment, as previously noted.

If the first five of the dollars printing segments have been turned to maximum extent from normal position, prefix bar 233 will be moved inwardly across and in front of shoulders 236 of those five segments, into its innermost position, with its inner end in contact with the last or sixth dollar printing segment, as shown in Figure 20, it being remembered that the latter segment and the two "cents" segments, when turned their maximum distance from normal position, have their "0" printing characters on the printing line. On the other hand, if any one of the first five dollars printing segments is in any other position, the prefix bar 233 will be moved inward only to the extent permitted by that segment. This variation in adjustment of the prefix bar is permitted by the yielding means, comprising the tension spring 422, for moving the prefix bar inwardly. After completion of the printing operation the pintle rod 296 is returned to its normal position shown in Figure 3, from its position shown in Figure 4 and, during such return movement, first contacts inclined edge 433 of arm 432, swinging this arm downward and raising bill 425. This swings shift lever 414 in clockwise direction about its pivot 415, moving prefix bar 233 outward, this movement being continued as pintle rod 296 passes from edge 433 of arm 432 onto the upper edge of this arm and along the latter, until prefix bar 233 has been returned to its outermost position with lever 414 in contact with the inner face of side plate 71, as shown in Figure 19, at which time pintle rod 296 has been returned to its normal position shown in Figure 5. By raising the outer end portion of link 412 it may be disengaged from stud 411, permitting of prefix bar 233 being completely withdrawn from the supporting member 225 for inspection, cleaning and repair or, if desired, replacement. We thus provide simple and highly efficient means for effecting automatic shifting of the prefix bar while permitting removal and replacement thereof with expedition and facility.

Toggle leaf 363 (Figure 13) is provided, at each end thereof and a short distance below stud 369, with a stud 435. Studs 435 project through arcuate slots 436 forming forward extensions of the openings 321 in the frame plates 70 and 71. Referring to Figure 3, a link 437, disposed adjacent the outer face of frame plate 70, is pivoted at its rearward end on stud 435 projecting through slot 436 of the latter plate. A link 438 (Figure 5), offset outward to clear lever 426 and associated parts, is pivotally mounted at its rearward end on stud 435 projecting through slot 436 in the other side frame plate 71. It will be understood that suitable means, of known type, is provided for confining the rearward ends of the links 437 and 438 against movement outward of the studs 435. Each of the links 437 and 438 is pivoted at its forward end, at 439, to the forward upper end of an approximately Z-shaped lever 440 pivoted, at the rearward portion of its upper end, at 441, on the associated side frame plate.

An ink pan 442 extends between the lower ends of the levers 440, across the check receiving opening 74 of the machine. Referring to Figures 3, 4, 21, 22 and 23, the ink pan 442 is of channel cross section with substantially triangular side walls and is provided, at the upper edge of its front wall, with a forwardly and upward curved lip 443 for convenience in handling. A curved mounting plate 444 is secured to and spaced from each side wall of ink pan 442. Plate 444 is provided, adjacent its forward end, with an outwardly projecting stud 444a and has a lengthwise slot 444b opening through its inner end. A bail 445, of elongated U-shape, extends between the lower ends of levers 440, on which the arms of bail 445 are pivoted. The left arm 445a of bail 445 is provided, at its forward end, with an inwardly projecting stud 445c. The right arm 445d of bail 445 is provided with an upwardly opening slot 445e and an inwardly projecting stud 445f respectively aligned transversely of bail 445 with slot 445b and stud 445c. The studs 445c and 445f enter slots 444b of mounting plates 444 and studs 444a of the mounting plates 444 enter slots 445b and 445e, for mounting the ink pan 442 on the bail 445. The ink pan 442 is thus removably mounted in bail 445 for movement therewith, with the bottom wall of the pan seating upon the cross bar or bight portion of the bail. When the latter is in its forward position, to which it is moved by downward and forward movement of the operating lever 275, the ink pan 442 may be tilted slightly and quickly and easily removed from or replaced in the bail 445, but removal of the ink pan 442 is prevented when bail 445 is in its normal rearward position; as will be explained more fully later.

A tension spring 450 is attached at its upper end to a pin 451 secured in plate 70, and has its lower end attached to a stud 452, which may be an outward extension of stud 445f, secured to arm 445d of bail 445. That arrangement will be clear from Figure 3. Referring to Figure 5, a U-shaped link 453 has the rearward end of its lower arm pivoted, at 454, to arm 445a of the bail 445. A coil tension spring 455 has its lower end attached to the rearward end of the upper arm of link 453, the upper end of said spring being anchored to a pin 456 secured to side frame plate 71. The tension springs 450 and 455 yieldingly urge bail 445, and with it the ink pan 442, upward about the pivot axis of bail 445 while permitting movement thereof with the levers 440.

Referring to Figures 3 and 21 an inking roller 462 is rotatably supported by the ink pan and extends transversely of the machine beneath the printing segments. This roller is separated lengthwise into two portions, one provided with a covering 463 of suitable absorbent material, such as felt, the other portion being provided with a similar covering 464, these two coverings being spaced apart by suitable spacing means 465 and being confined against endwise movement on shaft 460 in a suitable manner. Covering 463 may be saturated with red ink and covering 464 may be saturated with blue ink, for a purpose to be later described. A pinion 466 is secured upon the right hand end of roller 462.

A transfer roller 468, which is similar to roller 462 and comprises two portions 469 and 470 spaced apart at their inner ends, at 471, and corresponding in length to portions 463 and 464, respectively, of the inking roller, is rotatably mounted in the side walls of the ink pan in rear of the inking roller and in contact therewith. A pinion 472 is suitably secured to the right hand end of roller 468 and meshes with pinion 466 of the inking roll.

An ink supply or fountain roller 458, similar to roller 468 and comprising two portions 459 and 459a spaced apart at their inner ends, at 460, and corresponding in length to portions 469 and 470, respectively, of transfer roller 468, is rotatably mounted in ink pan 442, at the front thereof and in contact with transfer roller 468. A pinion 461 is suitably secured to the right hand end of roller 458 and meshes with pinion 472 of the transfer roller 468.

A ratchet pawl 473 (Figures 3 and 23) is pivoted on the inner face of side frame plate 70, on a stud 474 which also provides a pivot for the right hand arm of clearing yoke 119. Pawl 473 is urged downward by gravity and its downward movement is limited by a finger 475 thereof disposed to contact a stop pin 476 secured to, and extending inward from, frame plate 71. In the normal rearward position of the ink pan 442 and the bail 445, the slot 445b in the left arm 445a of bail 445 underlies a stud 448 at the inner face of lever 440 (Figures 3 and 13), and ratchet pawl 473 overlies the right hand portion of ink pan 442. The ink pan 442, when in its normal rearward position, is thus held against removal from the bail 445.

An inking roller throwoff angle lever 505 is pivoted at 506 on the outer face of frame plate 70, as shown in Figure 3. This lever is provided, in its rearward end, with a slot 507 which receives roller 337 mounted on stud 335a carried by the aligner shaft 332, shown in Figure 18. In the normal position of the main operating cam 286, shown in Figure 3, ink pan 442 is in its rearward position and the forward end of lever 505 bears upon the upper portion of arm 445d of bail 445, the rearward end of this lever being held raised by the roller 337, holding the ink pan 442 depressed with the inking roller 462 out of contact with the characters aligned on the printing line of the machine. At that time the inking roller is disposed below the printing characters on the printing line of the machine, with its axial vertical plane slightly rearward of such characters. In the forward and downward movement of the main operating cam 286 the printing segments are adjusted and are then accurately aligned and locked in adjustment by the aligning and locking means, in the manner previously described. The movement of the aligning shaft, during the operation of aligning and locking the segments, results in downward movement of the rearward end of lever 505, raising the forward end thereof and permitting the ink pan 442 to be raised, thus bringing the inking roller into contact with the printing characters on the printing line of the machine. Thereafter, the toggle structure is extended for effecting the printing operation, causing the toggle leaf 368 (Figure 13), to swing downward and rearward, thus causing rearward movement of the links 437 and 438, swinging the levers 440 upward and forward and causing the inking roller 462 to roll across the aligned printing characters, effectively inking the latter. When the ink pan 442 moves upward so as to bring the inking roller into inking position, a collar 503 about stud 445f extends above and in back of a cam shoulder 508 formed on the adjacent edge of plate 70. After the inking operation has been completed, and in the continued forward and upward movement of levers 440, collar 503 contacts shoulder 508, depressing the ink pan 442 and moving the inking roller downward away from the printing characters and segments. During the remainder of the forward travel of ink pan 442, collar 503 travels along the edge of plate 70 and limits upward movement of the ink pan to the extent determined by the formation of that edge portion of the plate. That guards against inking of any of the printing characters or type except those on the printing line. As collar 503 passes onto the cam shoulder 508, a ratchet wheel 430 secured to ink roller 459 engages the teeth of pawl 473 and, in the continued forward movement of levers 440, roller 459 is rotated in clockwise direction, as viewed in Figures 3 and 4, thus rotating the rollers 469 and 462 through the pinions 461, 472 and 466. The ink supply roller 459 is kept saturated with ink which, when the rollers in the ink pan 442 are rotated, is transferred by roller 468 to the inking roller 462. In that manner, the supply of ink to the inking roller is replenished from the supply roller upon each operation of the machine, which assures adequate inking of the printing characters. Upon return of the main operating cam 286 to its normal position, shown in Figure 3, the ink pan 442, together with the inking and transfer rollers, is returned to normal position.

A latch pawl 490 (Figure 3) is pivoted at 491 on side frame plate 70 and is urged in counterclockwise direction by a tension spring 492 anchored to the upper arm 493 of pawl 490 and to pin 451. Movement of pawl 490 counterclockwise is limited by contact of finger 494 thereof with tail piece 301 of the main cam 286. The notched lower end of arm 495 of pawl 490 is then disposed in front of stud 452 extending from the right arm 445d of bail 445, when cam 286 is in its normal position shown in Figure 3. When the collar 503 reaches the front of cam shoulder 508, in the upward and forward movement of bail 445 and ink pan 442, the notched lower end of arm 495 of pawl 490 snaps into position with shoulder 496 thereof engaging over stud 452. Latch pawl 490 remains thus engaged with stud 452 during the remainder of the forward stroke of the operating lever 275 and throughout the major portion of its rearward stroke. When the operating lever reaches about the midpoint of its rearward stroke, the inking roller throwoff angle lever 505 is returned to its operative position, effective for holding the inking roller out of contact with the type on the printing line, as has been explained above. Shortly thereafter, tail piece 301 of cam 286 contacts finger 494 of latch pawl 490 and disengages shoulder 496 thereof from stud 452. When that occurs, angle lever 505 effectively prevents upward movement of the inking roller into contact with the type on the printing line, as noted. I thus assure that only the type on the printing line will be inked and that inking thereof will occur during the forward stroke only of the operating lever 275. This is desirable as avoiding unnecessary inking of the type and effecting a substantial saving in ink as compared to checkwriters in which inking occurs on both the forward and rearward strokes of the operating lever.

In order to control the extent of insertion of a check into the machine, slotted rack bars 510 are slidably mounted upon the base portions 72 of the plates 70 and 71, at the outer faces thereof, as shown in Figures 3 and 5. These bars mesh with pinions 511, appropriately secured upon the ends of a shaft 512 rotatably mounted through base portions 72 of plates 70 and 71, a short distance from the front thereof. This assures similar adjustment of the bars. Each bar 510 is provided, at its upper edge and a considerable distance from its forward end, with an upwardly projecting stop finger 513 extending across the check receiving opening 74 and shaped as shown. An angle bracket 514 (Figures 2 and 3) is welded or otherwise suitably secured to the outer face of each bar 510, substantially in the plane of finger 513 thereof, extends upward a short distance above the bar, and thence outward laterally therefrom, being provided, at its outer end, with a vertically extending finger grip 515. Adjustment of the bars 510 determines the extent to which a check may be inserted into the machine, as will be clear.

Referring to Figures 3, 4 and 12, a link 517 is pivoted at its forward end, at 517a, to the right arm of clearing yoke 119, above the stud 474. Link 517 comprises two parts 517b and 517c adjustably secured together by screw and slot means 517d whereby its effective length may be varied. The rearward end of link 517 is pivoted on a stud 517e fixed to the upper end of an arm 518 fixed at its lower end on a cross rod 518a rockably mounted in the frame side plates 70 and 71. A latch pawl 519 is pivoted, at 519a, on a rearward extension 306a of lever 306. The pawl 519 is urged clockwise (Figure 3) by a tension spring 520 anchored thereto and to arm 518 above cross rod 518a. Normally, the notched rearward end portion of upper arm 519b of pawl 519 rests upon stud 517e and the lower arm 519c thereof is in close proximity to the head of screw 313. The arm 518 is held against forward movement beyond its position shown in Figure 3, by link 517 and the clearing yoke 119, which latter is held against forward movement beyond its position shown in the manner previously described. In the forward and downward movement of lever 275, to effect a printing operation, the lever 306 is turned clockwise into its position shown in Figure 4. That moves the latch pawl 519 downward and rearward to its position shown, in which arm 519b is held by tension spring 520 in contact with stud 517e, with shoulder 521 slightly in advance of the lower portion of stud 517e. In the rearward stroke of operating lever 275, after completion of a printing operation, lever 306 is turned counterclockwise. That forces latch pawl 519 upward and rearward, bringing shoulder 521 thereof into contact with stud 517e and swinging arm 518 rearward. This rearward movement of arm 518, and with it the link 517, swings the clearing yoke 119 rearward or clockwise. If the repeat key 124 is then in its inoperative or raised position, the bight portion of clearing yoke 119 contacts fingers 115d of clearing bar 115, forcing the latter rearward for releasing any then depressed keys of the keyboard and thereby clearing the machine, in the manner previously described. If the repeat key 124 is in its operative or depressed position, the clearing yoke 119 is ineffective and any desired number of checks, all for the same amount, may then be printed successively, without necessity for resetting the machine. After such checks have been printed, the machine may be cleared for resetting, by depressing the clearing key 140, as has been explained. In the continued rearward stroke of the operating lever 275, the head of screw 313 contacts arm 519c of latch pawl 519 turning the latter counterclockwise until the shoulder 521 passes above stud 517e. Tension spring 520 then swings arm 518 forward, returning the clearing yoke 119 to its normal forward position and disposing stud 517e so that the lower edge of arm 519b of pawl 519, slightly in advance of shoulder 521, rests upon the top of stud 517e. The parts are then in their normal positions shown in Figure 3, at the end of the rearward stroke of operating lever 275.

The ink pan 442, previously referred to, suffices to catch and retain such slight amount of ink as may drip from the inking rolls. During the printing operation, however, the check blank being printed upon is raised upward by the printing platen, while the ink pan 442 and the parts carried thereby are being moved forward, as will be understood from Figures 4 and 13. There is the possibility that, during such upward movement, the check blank may become smudged by contact with the inking roller, to prevent which a smudge guard plate 525 (Figures 1 and 2) is provided. This plate extends transversely of the machine, through the check-receiving opening 74 and is provided, at one end, with an upwardly extending arm 526. This arm is pivoted at its upper end, by means of a shouldered screw 527, to a suitably bored and threaded stud 528 (Figure 5) secured to frame plate 71 and projecting outward therefrom, it being understood that the enclosing casing of the machine is provided with a suitable opening accommodating the screw 527. At its other end, plate 525 is provided with an upwardly and forwardly extending arm 529 pivoted at its upper end, by means of a shouldered screw 530, to a suitably bored and threaded stud 531 secured to and projecting outward from the frame plate 70, as will be clear from Figure 3. Suitable means is provided for limiting downward movement of plate 525 and holding it in a position in which it is inclined downward and rearward toward the surface 69, to facilitate insertion of a check into the machine. The plate 525 is so spaced from the surface 69 that it at no time rests upon a check blank when the latter is flat upon surface 69, plate 525 being effective to eliminate possibility of smudging of the check during the printing operation, as above explained.

Referring to Figure 1, arm 529 is provided, at the lower rearward end thereof, with two outwardly projecting tabs 535, defining between them a slot 536, which slot is aligned transversely of the machine with the printing line, for properly positioning the check when inserted into the machine, the check gauge or stop means comprising the stop fingers 513 being, of course, properly adjusted to that end.

It will be understood that changes may be made without departing from the field and scope of my invention and I intend to include all such variations, as fall within the appended claims, in this application in which the preferred form only of my invention has been disclosed.

I claim:

1. In a machine for writing checks, a frame, individually adjustable type members adjacent the front of said frame and key controlled setting means therefor, a keyboard on said frame, a plurality of series of keys carried by said keyboard yieldingly held in raised inoperative position, locking bars associated with the respective series of keys yieldingly held forward in locking position and movable rearward to releasing position, said bars and keys having cooperating means effective for locking a depressed key in operative position and moving the locking bar to releasing position thereby releasing a depressed key in the depression of a key of the same series, a clearing bar slidably and pivotally mounted on said keyboard extending across the forward ends of said locking bars, a repeat key on said keyboard yieldingly held in raised operative position, means for holding said repeat key in depressed inoperative position, said repeat key and clearing bar having cooperating means for raising and lowering said clearing bar to operative position and inoperative position responsive to raising and depressing of said repeat key respectively, a clearing yoke pivoted on said frame in front of said clearing bar, the latter having elements disposed to be contacted by said yoke in the rearward movement thereof when said clearing bar is raised and disposed to clear said yoke when said clearing bar is lowered, operating means for effecting the printing operation, and means actuated by said operating means effective for swinging said yoke rearward responsive to completion of the printing operation.

2. In a machine for writing checks, a frame, individually adjustable type members adjacent the front of said frame and key controlled setting means therefor, a keyboard on said frame, a plurality of series of keys carried by said keyboard yieldingly held in raised inoperative position, locking bars associated with the respective series of keys yieldingly held forward in locking position and movable rearward to releasing position, said bars and keys having cooperating means effective for locking a depressed key in operative position and moving the locking bar to releasing position thereby releasing a depressed key in the depression of a key of the same series, a clearing bar slidably and pivotally mounted on said keyboard extending across the forward ends of said locking bars, a repeat key on said keyboard yieldingly held in raised operative position, means for holding said repeat key in depressed inoperative position, said repeat key and clearing bar having cooperating means for raising and lowering said clearing bar to operative position and inoperative position responsive to raising and depressing of said repeat key respectively, a clearing yoke pivoted on said frame in front of said clearing bar, the latter having elements disposed to be contacted by said yoke in the rearward movement thereof when said clearing bar is raised and disposed to clear said yoke when said clearing bar is lowered, operating means for effecting the printing operation, means actuated by said operating means effective for swinging said yoke rearward responsive to completion of the printing operation, and means for swinging said yoke rearward independently of said operating means.

3. In a machine for writing checks, a frame, individually adjustable type members adjacent the front of said frame and key controlled setting means therefor, a keyboard on said frame, a plurality of series of keys carried by said keyboard yieldingly held in raised inoperative position, locking bars associated with the respective series of keys yieldingly held forward in locking position and movable rearward to releasing position, said bars and keys having cooperating means effective for locking a depressed key in operative position and moving the locking bar to releasing position thereby releasing a depressed key in the depression of a key of the same series, a clearing bar slidably and pivotally mounted on said keyboard extending across the forward ends of said locking bars, a repeat key on said keyboard yieldingly held in raised operative position, means for holding said repeat key in depressed inoperative position, said repeat key and clearing bar having cooperating means for raising and lowering said clearing bar to operative position and inoperative position responsive to raising and depressing of said repeat key respectively, a clearing yoke pivoted on said frame in front of said celaring bar, the latter having elements disposed to be contacted by said yoke in the rearward movement thereof when said clearing bar is raised and disposed to clear said yoke when said clearing bar is lowered, operating means for effecting the printing operation, means actuated by said operating means effective for swinging said yoke rearward responsive to completion of the printing operation, means for swinging said yoke rearward independently of said operating means, a clearing key on said keyboard yieldingdy held in raised inoperative position and movable therefrom downward to operative position, and lost motion connections between said clearing key and yoke effective for swinging the latter rearward responsive to downward movement of said clearing key to operative position.

4. In a machine for writing checks, a frame, individually adjustable type members adjacent the front of said frame and key controlled setting means therefor, a keyboard on said frame, a plurality of series of keys carried by said keyboard yieldingly held in raised inoperative position, locking bars associated with the respective series of keys yieldingly held forward in locking position and movable rearward to releasing position, said bars and keys having cooperating means effective for locking a depressed key in operative position and moving the locking bar to releasing position thereby releasing a depressed key in the depression of a key of the same series, a clearing yoke pivoted on the front of said frame for forward and rearward movement, said yoke having limited forward movement and being normally yieldingly held in forward position, a clearing member actuated by said yoke in its rearward movement effective for moving said locking bars rearward to releasing position, operating means for effecting the printing operation comprising an operating member having a printing stroke in one direction and a return stroke in the opposite direction, a link pivoted at its forward end to said yoke above the pivot thereof and extending rearward therefrom, and means effective in the return stroke of said operating member for moving said link rearward and thereby swinging said yoke rearward for effecting a clearing operation and then releasing said link for forward movement thereof and of said yoke.

5. In a machine for writing checks, a frame, individually adjustable type members adjacent the front of said frame and key controlled setting means therefor, a keyboard on said frame, a plurality of series of keys carried by said keyboard yieldingly held in raised inoperative position, locking bars associated with the respective series of keys yieldingly held forward in locking position and movable rearward to releasing position, said bars and keys having cooperating means effective for locking a depressed key in operative position and moving the locking bar to releasing position thereby releasing a depressed key in the depression of a key of the same series, a clearing yoke pivoted on the front of said frame for forward and rearward movement, said yoke having limited forward movement and being normally yieldingly held in forward position, a clearing member actuated by said yoke in its rearward movement effective for moving said locking bars rearward to releasing position, means comprising a clearing key on said keyboard for swinging said yoke rearward, operating means for effecting the printing operation comprising an operating member having a printing stroke in one direction and a return stroke in the opposite direction, a link pivoted at its forward end to said yoke above the pivot thereof and extending rearward therefrom, and means effective in the return stroke of said operating member for moving said link rearward and thereby swinging said yoke rearward for effecting a clearing operation and then releasing said link for forward movement thereof and of said yoke.

6. In a machine for writing checks, a frame, individually adjustable type members adjacent the front of said frame and key controlled setting means therefor, a keyboard on said frame, a plurality of series of keys carried by said keyboard yieldingly held in raised inoperative position, locking bars associated with the respective series of keys yieldingly held forward in locking position and movable rearward to releasing position, said bars and keys having cooperating means effective for locking a depressed key in operative position and moving the locking bar to releasing position thereby releasing a depressed key in the depression of a key of the same series, a clearing yoke pivoted on the front of said frame for forward and rearward movement, said yoke having limited forward movement and being normally yieldingly held in forward position, a clearing member actuated by said yoke in its rearward movement effective for moving said locking bars rearward to releasing position, means comprising a repeat key on said keyboard for optionally enabling and disabling said clearing member, operating means for effecting the printing operation comprising an operating member having a printing stroke in one direction and a return stroke in the opposite direction, a link pivoted at its forward end to said yoke above the pivot thereof and extending rearward therefrom, and means effective in the return stroke of said operating member for moving said link rearward and thereby swinging said yoke rearward for effecting a clearing operation and then releasing said link for forward movement thereof and of said yoke.

7. In a machine for writing checks, printing and setting means comprising a plurality of series of setting keys, locking bars associated with the respective series of keys yieldingly urged forward to locking position and movable rearward to releasing position, a slidably and pivotally mounted clearing bar extending across the forward ends of said locking bars, a clearing yoke pivotally mounted adjacent said clearing bar, the latter having an effective position and an ineffective position relative to said yoke, a repeat key having an operative position and an inoperative position, said key and clearing bar having cooperating means for moving said clearing bar to ineffective position and effective position responsive to movement of said key to operative position and inoperative position respectively, operating means for effecting the printing operation, and means actuated by said operating means effective for swinging said yoke rearward responsive to completion of the printing operation and thereby moving rearward said clearing bar, when the latter is in effective position, and moving said locking bars rearward to releasing position.

8. In a machine for writing checks, printing and setting means comprising a plurality of series of setting keys, locking bars associated with the respective series of keys yieldingly urged forward to locking position and movable rearward to releasing position, a slidably and pivotally mounted clearing bar extending across the forward ends of said locking bars, a clearing yoke pivotally mounted adjacent said clearing bar, the latter having an effective position and an ineffective position relative to said yoke, a repeat key having an operative position and an inoperative position, said key and clearing bar having cooperating means for moving said clearing bar to ineffective position and effective position responsive to movement of said key to operative position and inoperative position respectively, operating means for effecting the printing operation, means actuated by said operating means effective for swinging said yoke rearward responsive to completion of the printing operation and thereby moving rearward said clearing bar, when the latter is in effective position, and moving said locking bars rearward to releasing position, and means for swinging said yoke rearward independently of said operating means.

9. In a machine for writing checks, printing and setting means comprising a plurality of series of setting keys, locking bars associated with the respective series of keys yieldingly urged forward to locking position and movable rearward to releasing position, a slidably and pivotally mounted clearing bar extending across the forward ends of said locking bars, a clearing yoke pivotally mounted adjacent said clearing bar, the latter having an effective position and an ineffective position relative to said yoke, a repeat key having an operative position and an inoperative position, said key and clearing bar having cooperating means for moving said clearing bar to ineffective position and effective position responsive to movement of said key to operative position and inoperative position respectively, operating means for effecting the printing operation, means actuated by said operating means effective for swinging said yoke rearward responsive to completion of the printing operation and thereby moving rearward said clearing bar, when the latter is in effective position, and moving said locking bars rearward to releasing position, a clearing key having an inoperative position and an operative position, and lost motion connections between said clearing key and said yoke effective for swinging the latter rearward responsive to movement of said clearing key to operative position.

10. In a machine for writing checks, printing and setting means comprising a plurality of series of setting keys, locking bars associated with the respective series of keys yieldingly urged forward to locking position and movable rearward to releasing position, a slidably mounted clearing bar extending across the forward ends of said locking bars, a clearing yoke pivotally mounted adjacent said clearing bar, said yoke having limited forward movement and being normally yieldingly held in forward position, operating means for effecting the printing operation comprising an operating member having a printing stroke in one direction and a return stroke in the opposite direction, an upwardly extending yoke operating arm rockably mounted at its lower end and yieldingly urged in forward direction, a link pivoted at its forward end to said yoke above the pivot thereof and extending rearward therefrom and pivoted at its rearward end to the upper end of said arm, latch means engageable with said arm adjacent the upper end thereof, and means actuated by said operating member effective for engaging said latch means with said arm in the operating stroke of said member and for moving said latch means rearward and thereby swinging said arm rearward and thereafter disengaging said latch means from said arm in the return stroke of said member.

11. In a machine for writing checks, printing and setting means comprising a plurality of series of setting keys, locking bars associated with the respective series of keys yieldingly urged forward to locking position and movable rearward to releasing position, a slidably mounted clearing bar extending across the forward ends of said locking bars, a clearing yoke pivotally mounted adjacent said clearing bar, said yoke having limited forward movement and being normally yieldingly held in forward position, operating means for effecting the printing operation comprising an operating member having a printing stroke in one direction and a return stroke in the opposite direction, an upwardly extending yoke operating arm rockably mounted at its lower end and yieldingly urged in forward direction, a link pivoted at its forward end to said yoke above the pivot thereof and extending rearward therefrom and pivoted at its rearward end to the upper end of said arm, a lever in front of said arm pivoted intermediate its ends, a latch member pivoted on the rearward end of said lever engageable with said arm by turning of said lever in one direction and disposed to swing said arm rearward when said lever is turned in the opposite direction, means for turning said lever in said one direction and in said opposite direction responsive to the printing stroke and the return stroke respectively of said operating member, and means for disengaging said latch member from said arm as said operating member approaches the end of its return stroke.

12. In a machine for printing checks, printing and setting means comprising a plurality of series of setting keys, slidably mounted locking bars associated with the respective series of keys yieldingly urged in locking direction, a slidably mounted clearing bar extending across said locking bars at one end thereof for moving the latter in releasing direction and having an effective position and an ineffective position, operating means for effecting the printing operation, a repeat key having an operative position and an inoperative position, said repeat key and clearing bar having cooperating means effective for moving said clearing bar to and retaining it in ineffective position and effective position responsive to movement of said repeat key to operative position and inoperative position respectively, and means supplementary to and actuated by said operating means effective for moving said clearing bar when in its effective position in clearing direction and thereby moving said locking bars in releasing direction responsive to completion of a printing operation, said clearing bar when in its ineffective position being disposed clear of said supplementary means.

13. In a machine for printing checks, printing and setting means comprising a plurality of series of setting keys, slidably mounted locking bars associated with the respective series of keys yieldingly urged in one direction to locking position and slidable in the opposite direction to releasing position, a slidably mounted clearing bar extending across said locking bars at one end thereof for moving the latter in releasing direction and having an effective position and an ineffective position, a clearing yoke pivotally mounted adjacent said clearing bar for movement toward and away from the latter, a repeat key having an operative position and an inoperative position, said repeat key and clearing bar having cooperating means effective for moving said clearing bar to and retaining it in ineffective position and effective position responsive to movement of said repeat key to operative position and inoperative position respectively, said clearing bar when in ineffective position being disposed to clear said yoke in the movement of the latter toward said clearing bar and when in effective position disposed to be contacted by said yoke in the movement of the latter toward said clearing bar, operating means for effecting the printing operation comprising an operating member having a printing stroke in one direction and a return stroke in the opposite direction, and operating connections between said operating means and said yoke effective in the return stroke of said operating member for causing movement of said yoke toward said clearing bar and thereby moving the latter when in its effective position toward said locking bars for effecting a clearing operation and then releasing said yoke for movement away from said clearnig bar.

References Cited in the file of this patent

UNITED STATES PATENTS

| Number | Name | Date |
|---|---|---|
| 1,214,632 | Woodward | Feb. 6, 1917 |
| 1,783,182 | Carlson | Dec. 2, 1930 |
| 1,783,219 | Carlson | Dec. 2, 1930 |
| 1,968,386 | Gubelmann | July 31, 1934 |
| 1,980,822 | Phinney | Nov. 13, 1934 |
| 2,081,836 | Racz | May 25, 1937 |
| 2,091,778 | Garbell | Aug. 31, 1937 |
| 2,103,098 | Slettevold | Dec. 21, 1937 |
| 2,109,104 | Dahlberg | Feb. 22, 1938 |
| 2,118,871 | Thompson | May 31, 1938 |
| 2,180,446 | Welter | Nov. 21, 1939 |
| 2,231,237 | Welter | Feb. 11, 1941 |
| 2,238,517 | Colley | Apr. 15, 1941 |
| 2,329,646 | Payne | Sept. 14, 1943 |
| 2,542,658 | Garbell | Feb. 20, 1951 |
| 2,604,040 | Fenstermaker | July 22, 1952 |